United States Patent [19]

Smyly, Sr.

[11] Patent Number: 5,203,582

[45] Date of Patent: Apr. 20, 1993

[54] SEPARABLE IMPROVED TRAILER TONGUE DEVICES

[76] Inventor: George M. Smyly, Sr., 1903-B Carlton St., North Charleston, S.C. 29405

[21] Appl. No.: 767,515

[22] Filed: Oct. 1, 1991

[51] Int. Cl.⁵ .............................................. B60D 1/38
[52] U.S. Cl. ................................... 280/477; 280/478.1
[58] Field of Search ................. 280/477, 478.1, 479.1, 280/479.2, 479.3, 480, 480.1, 482

[56] References Cited

U.S. PATENT DOCUMENTS

| | | | |
|---|---|---|---|
| 3,596,925 | 8/1971 | Richie | 280/477 |
| 3,848,895 | 11/1974 | Christopher | 280/478.1 |
| 5,005,852 | 4/1991 | Smyly, Sr. | 280/477 |
| 5,009,445 | 4/1991 | Williams, Jr. | 280/480 X |
| 5,048,854 | 9/1991 | Clark | 280/477 |
| 5,085,408 | 2/1992 | Norton et al. | 280/477 X |

FOREIGN PATENT DOCUMENTS 872433 2/1953 Fed. Rep. of Germany ...... 280/477

Primary Examiner—Robert J. Oberleitner
Assistant Examiner—Kevin Hurley

[57] ABSTRACT

Providing an improved separable trailer tongue hitching device for a trailer is accomplished by constructing a trailer tongue having a coupling component which is easily separated from the main body of the tongue and coupled to a towing vehicle for the purpose of drawing the main body of the tongue into unison with the coupling component. A winch, which is suitably combined with the trailer or the trailer tongue and which has a cable connected thereto and connected to the coupling component, is employed to draw the main body of the tongue into unison with the coupling component.

27 Claims, 12 Drawing Sheets

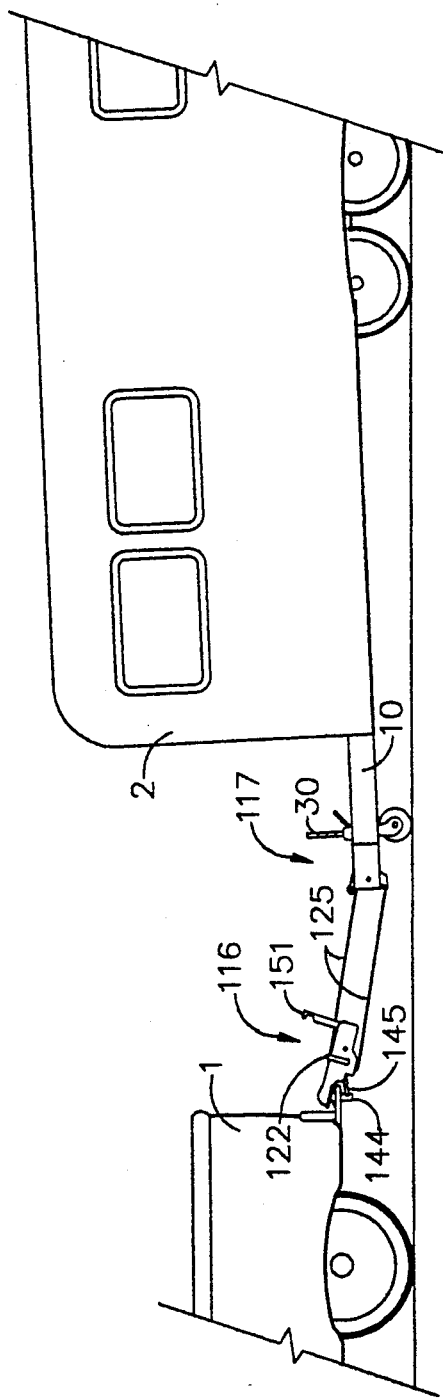
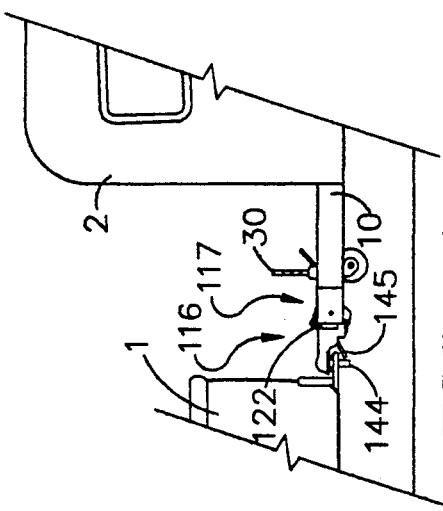
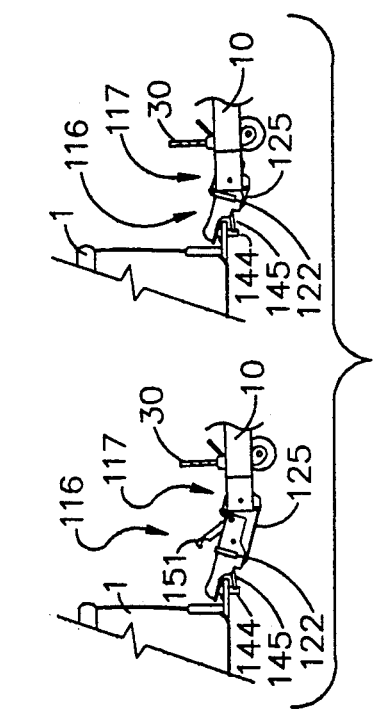
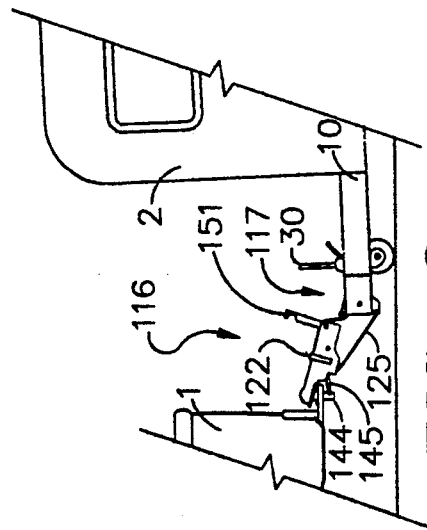

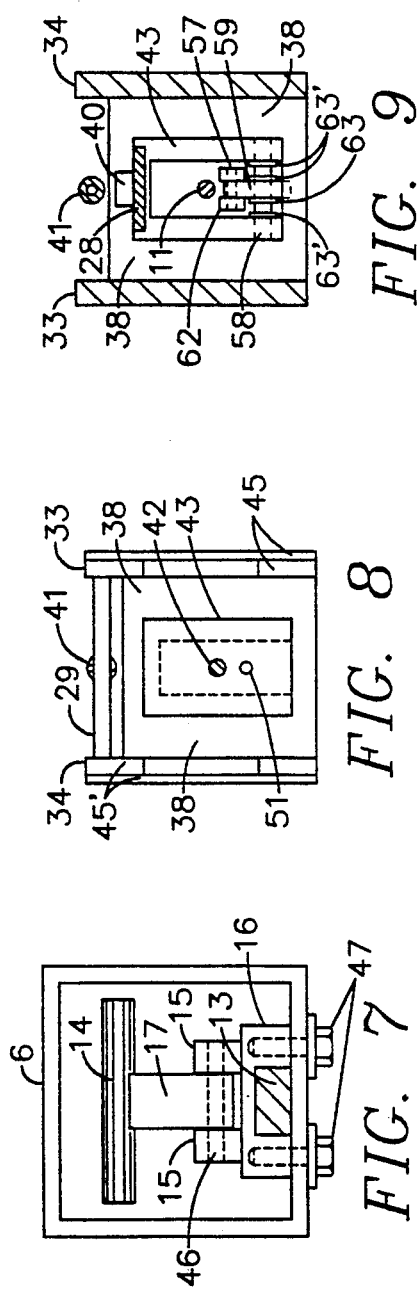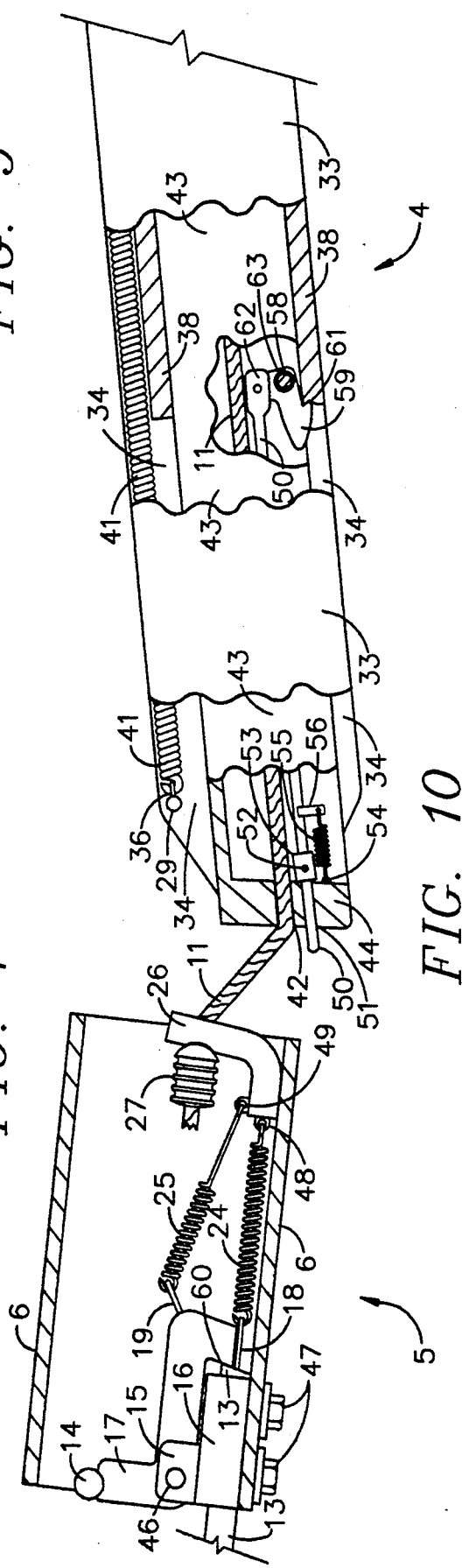

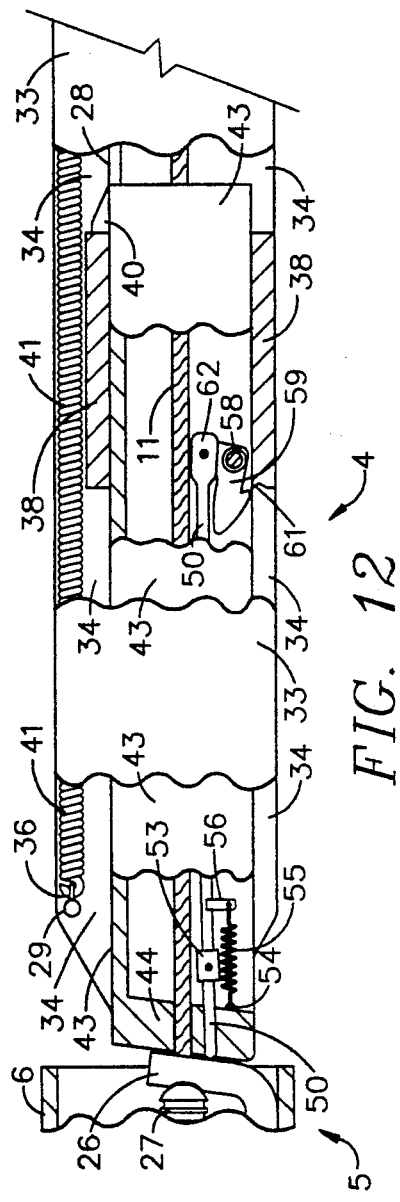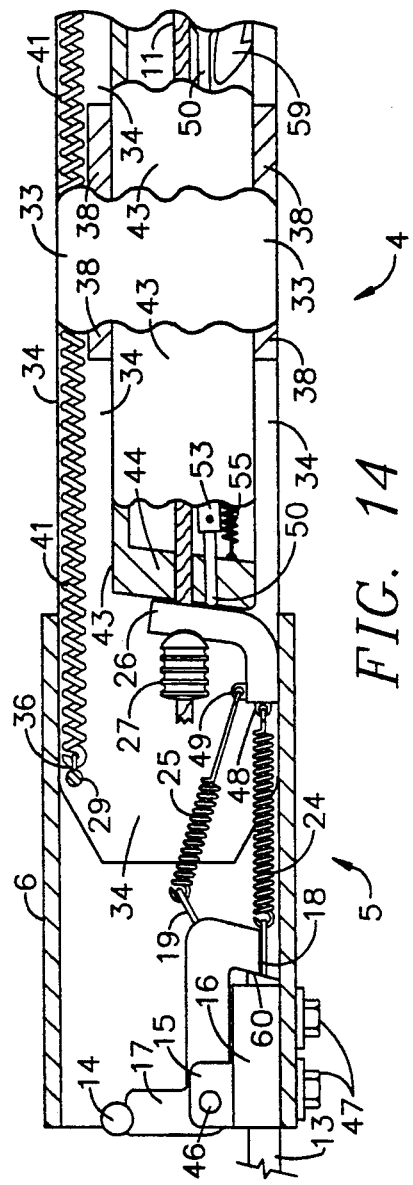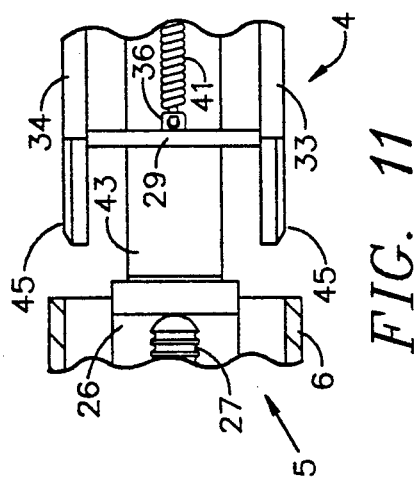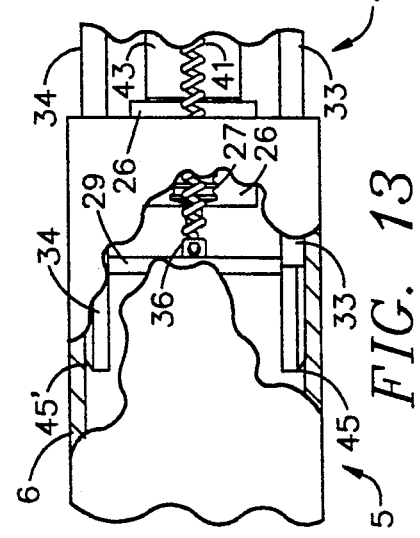

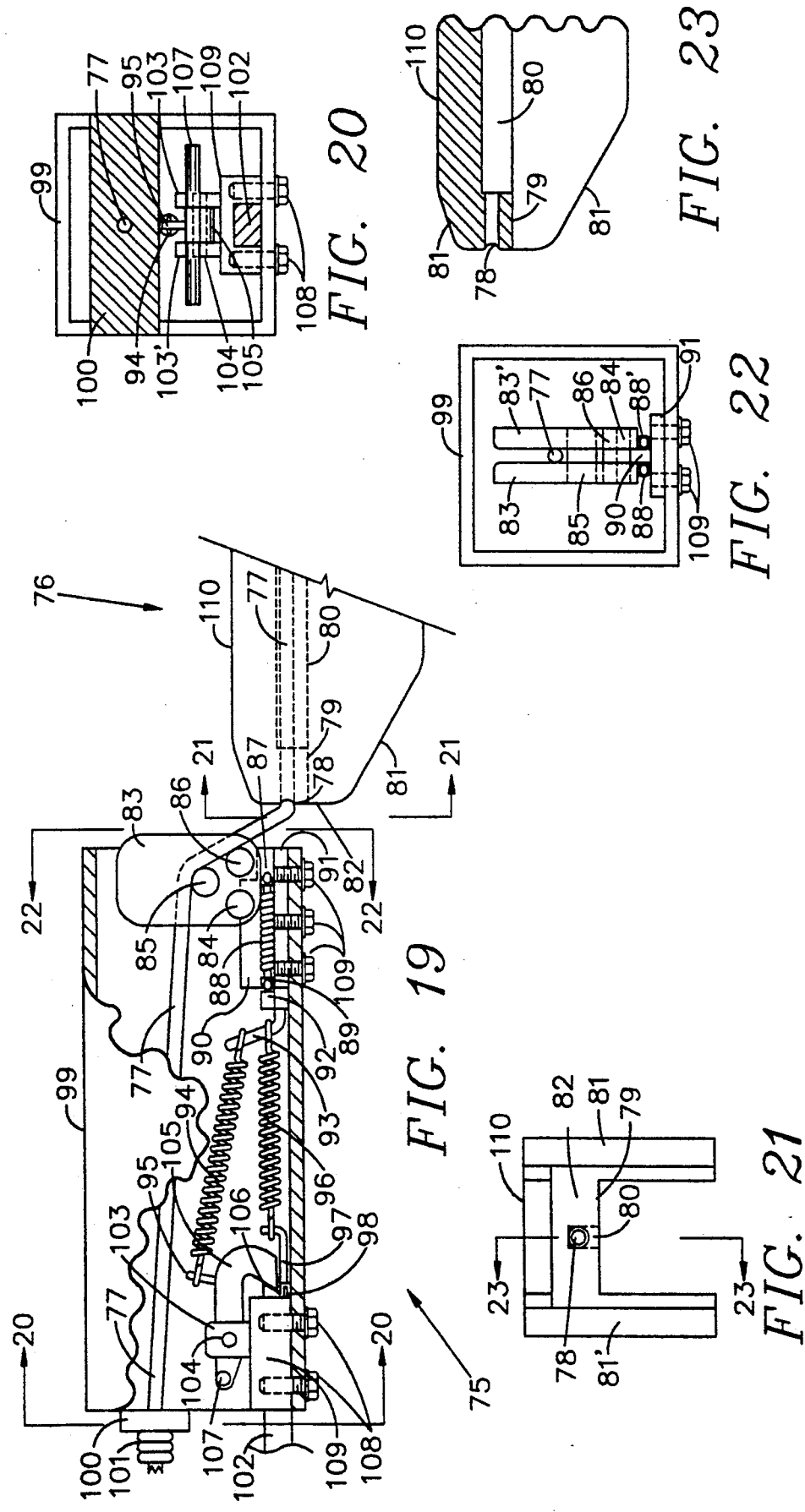

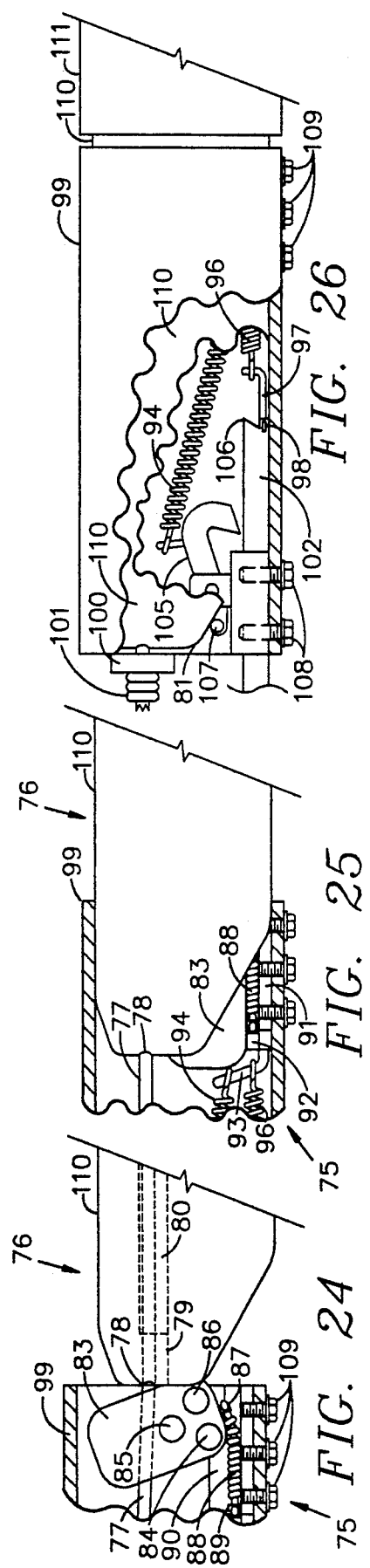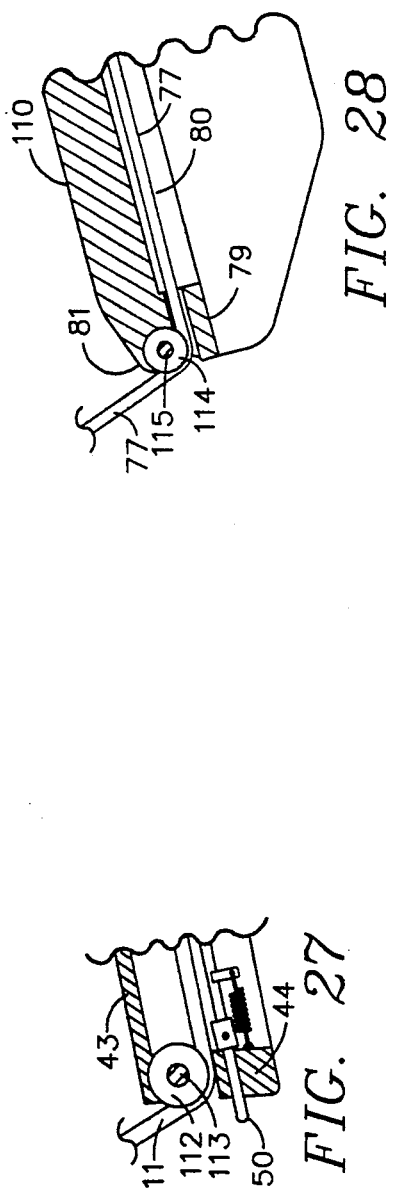

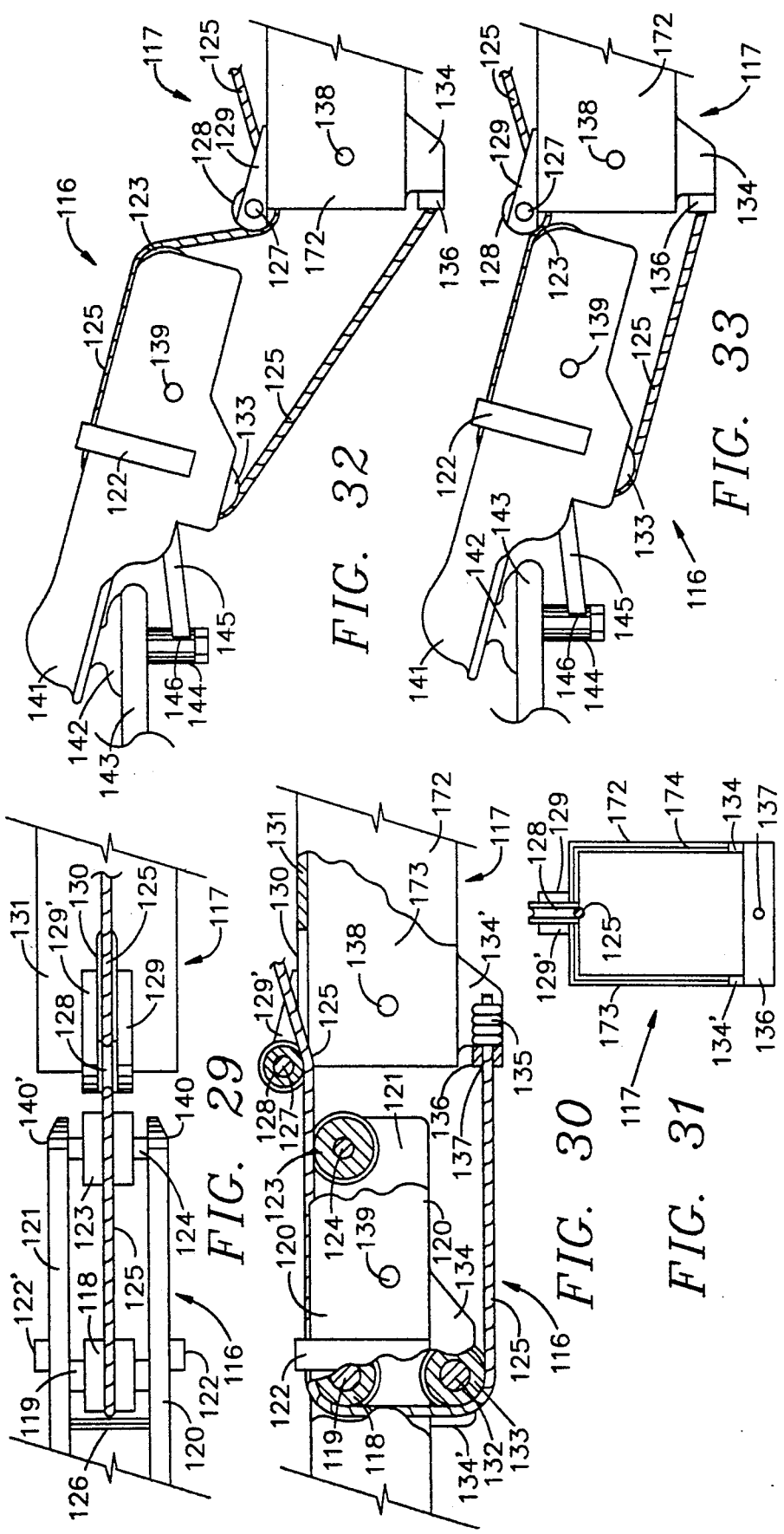

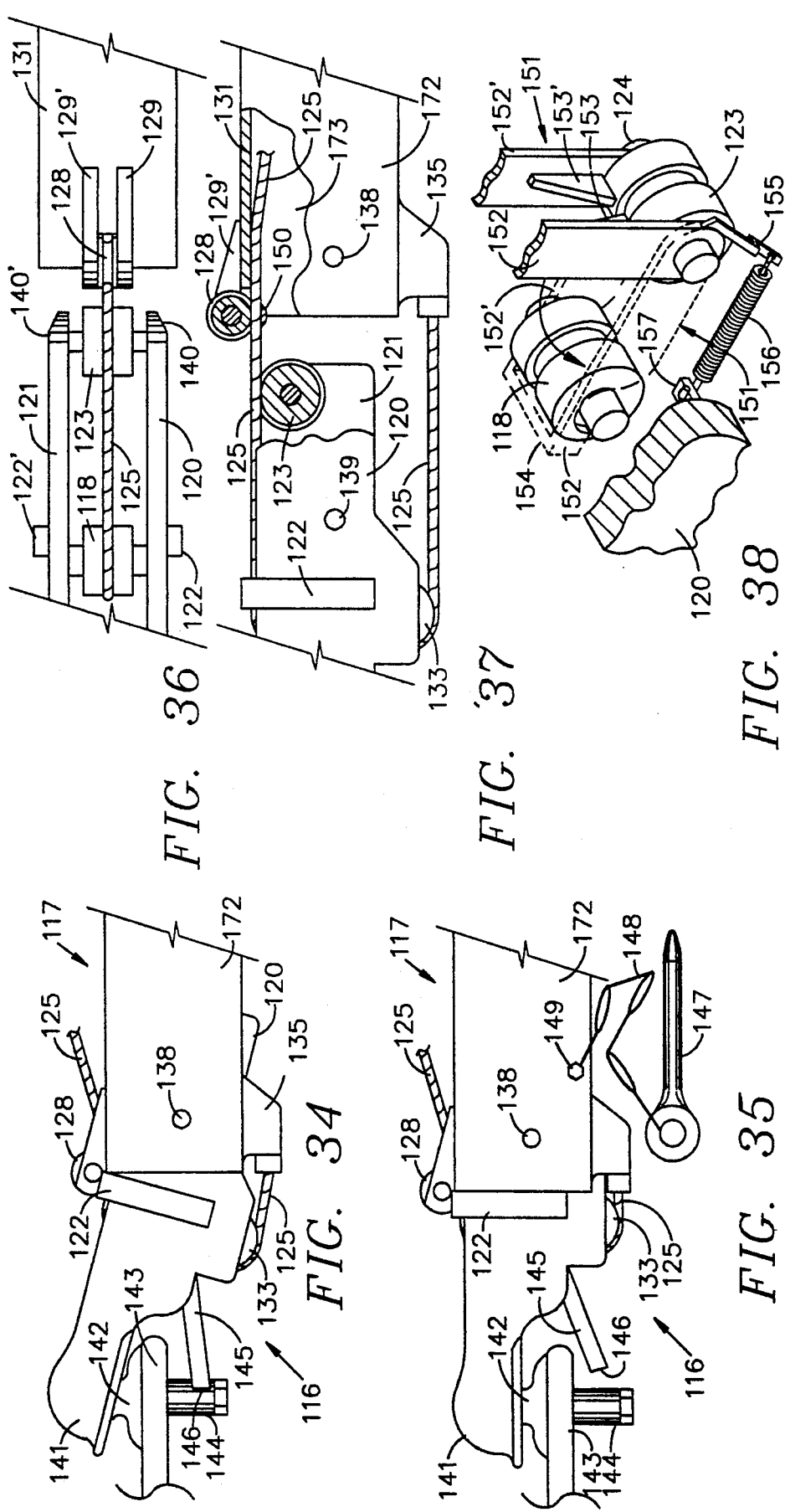

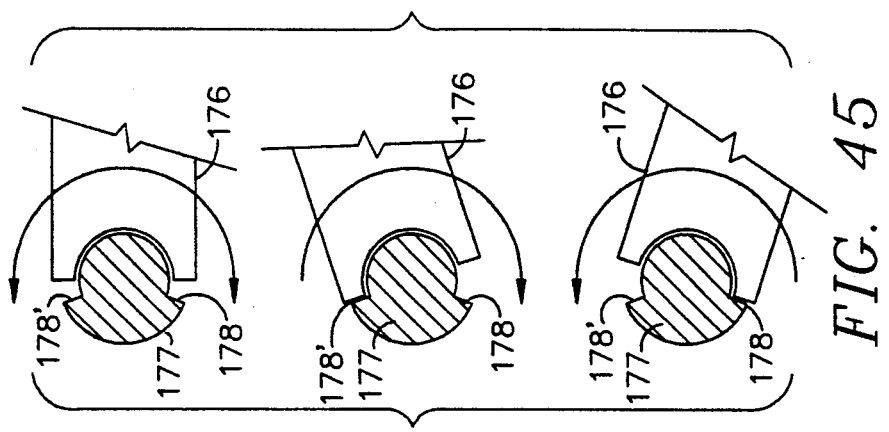
FIG. 45
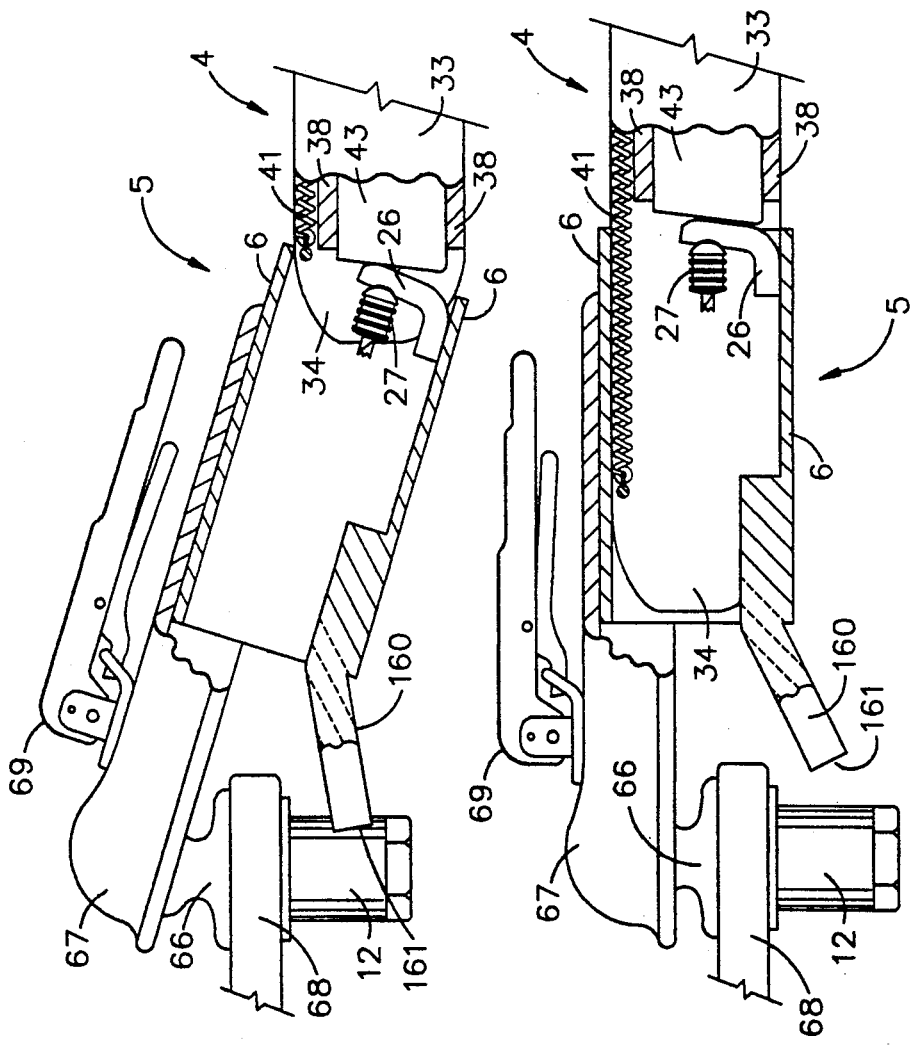
FIG. 43
FIG. 44

SEPARABLE IMPROVED TRAILER TONGUE DEVICES

REFERENCES TO RELATED APPLICATIONS

This application is an improvement patent application over my SEPARATIVE TRAILER TONGUE HITCHING METHOD, U.S. Pat. No. 5,005,852, issued Apr. 9, 1991.

BACKGROUND OF THE INVENTION

1. Field of the Invention

The present invention relates to trailer hitching devices. More specifically, the present invention relates to improvements over my SEPARATIVE TRAILER TONGUE HITCHING METHOD, U.S. Pat. No. 5,005,852, issued Apr. 9, 1991.

2. Prior Art

The point of novelty and the "grand key" to my referenced invention is the comparatively easy to manage vehicular coupling component of a trailer tongue which is separated from the usually unwieldy and cumbersome main body of the trailer tongue and coupled to a towing vehicle for the purpose of effortlessly uniting the separated vehicular coupled coupling component with the main body of the trailer tongue via winch means and wherein no cumbersome devices are permanently combined with the towing vehicle.

Although my patented invention is a very practical and useful device as it stands and although the device teaches a new concept. I have made major improvements to the original invention without departing from the new concept such as: A single length of cable is now joining the separable components of the device (the original invention has a looped cable joining the separable components). An inset component having no moving parts is combined with the main body of the trailer tongue, the component replacing the slide rod and bifurcated bars of the original invention. A vehicular coupled receivable frame that is received into a receptor component of the main body of the trailer tongue (in all other embodiments of the device the main body components are received into the vehicular coupled component).

The device of Cecil J. Putnam, Jr. and James E. Malone, U.S. Pat. No. 4,125,272, issued Nov. 14, 1978, wherein a hitch includes an extensible universally pivotable support for one of the hitch components permitting interconnection between a towing vehicle and a trailer such that the towing vehicle can pull the trailer to a near alignment and the hitch members to a towable condition, is noteworthy.

The device of Nicky G. Belcher, U.S. Pat. No. 4,807,899, issued Feb. 28, 1989, is noteworthy and wherein a hitch assembly includes a vehicle mounted receiver defining a tubular passage way, a winch extending a retractable cable rearward through the passage way, and a hitch bar connectable to the end of the cable as well as to a hitch fixture of a towed element, whereby the cable can be retracted to draw the hitch bar up within the receiver passage way with the towed element aligned and the hitch connection locked.

The device of James Steel, European Patent 0136017 A2, published Mar. 4, 1985 is noteworthy. The description of this device teaches, among other teachings, a credible method for hitching a trailing vehicle to a towing vehicle, (no effort will be made to specifically describe this multi-purpose device of Steel).

The above prior art devices give evidence that there is an on going need to solve the numerous problems often encountered during trailer hitching operations.

However, it should be desirable to have trailer hitching devices having no cumbersome components combined with the towing vehicle.

No known device is an improvement over my Separative Trailer Tongue Hitching Device.

SUMMARY OF THE IMPROVED INVENTION

The principal object of the present improvement invention is to improve an already practical and useful device.

Another object of the present improvement invention is to provide a device having no cumbersome members thereof combined with a towing vehicle.

Another object of the present improvement invention is to provide a device wherein major components thereof remain combined with a trailing vehicle.

It is yet another object of the present improvement invention to provide a device requiring low maintenance.

Yet another object of the present improvement invention is to provide a physically easy method of hitching any size trailing vehicle to a towing vehicle.

It is also an object of the present invention to provide a device which can be combined with any towing vehicle and trailing vehicle, or any objects (aligned or non-aligned), which need to be draw together.

Another object of the present improvement invention is to provide a device for enabling the user to hitch a massive trailing vehicle to a towing vehicle without the assistance of a second person.

Yet another object of the present improvement invention is to provide a device wherein components thereof can be easily combined with diverse conventional coupling means.

A further object of the present improvement invention is to provide a device requiring no special training in the use thereof and therefore a device which can be used by the general public.

Yet an even further object of the present improvement invention is to provide a device that is especially useful in sandy locations such as a desert.

Still further yet an object of the present improvement invention is to teach that a suitable trailer tongue jack wheel or the like should be combined with a separable trailer tongue.

Finally, it is an object of the present improvement invention to provide a low cost easily constructed device that will make life more pleasant for those requiring the use of a trailing vehicle.

Briefly, the foregoing objects related to improvements to my Separative Trailer Tongue Hitching Method are accomplished by continuing to provide a type trailer tongue or towing bar having the vehicular coupling component thereof easily separated from the main body of the trailer tongue or towing bar and then coupling or hitching this component to a towing vehicle for the purpose of drawing the main body into unison with the vehicular coupled component via winch means.

BRIEF DESCRIPTION OF THE DRAWINGS

With the stated objectives in view, and additional objects and advantages, as will hereinafter appear, this improvement invention consist of the shapes, combinations and arrangements of materials described by examples and illustrated in the following drawings in which like reference characters refer to like parts, wherein:

FIG. 1 depicts a plane side view of a braced diagonally arranged receivable frame coupled to a towing vehicle and a receptor combined with a trailer tongue, the vehicle being appreciably distanced from the trailer tongue, and a looped winch cable extending from the receptor to the receivable frame, the cable extending from the receivable frame returning to the receptor and to winch means associated with the trailer tongue (prior art winch means not show).

FIG. 2 depicts a view similar to FIG. 1, the view being compacted, in which the receivable frame and receptor are drawn somewhat closer via winch means.

FIG. 3 depicts a twosome view, the independent segments being similar to, though more compacted than, FIG. 2, the left view showing the receptor drawn and lifted into contact with the receivable frame, the right view showing the yet further drawn receptor contacting receptor stop members of the receivable frame.

FIG. 4 depicts a view similar to FIG. 2, wherein the receptor and receivable frame are drawn into a fully united arrangement, the previously diagonally arranged receivable frame having been drawn into longitudinal alignment with and within the receptor.

FIG. 7 depicts a view taken along the line 7—7 of FIG. 6.

FIG. 8 depicts a view taken along the line 8—8 of FIG. 6.

FIG. 9 depicts a view taken along the line 9—9 of FIG. 6.

FIG. 10 depicts a view similar to FIG. 6, wherein the first and second assembly members of the improved device are somewhat diagonally arranged.

FIG. 11 depicts a partial compacted top view of FIG. 6, wherein first and second assembly members of the device initially come into contact.

FIG. 12 depicts a cut-away partial sectional side view of the first and second assembly members of the device wherein the members initially come into contact.

FIG. 13 depicts a compacted cut-away partial sectional top view of FIG. 14 wherein the first and second assembly members of the device are partially united.

FIG. 14 depicts a cut-away partial sectional side view of the first and second assembly members of the device partially united.

FIG. 19 depicts a partial cut-away side view of a new embodiment of the device.

FIG. 20 depicts a view taken along the line 20—20 of FIG. 19.

FIG. 21 depicts a view taken along the line 21—21 of FIG. 19.

FIG. 22 depicts a view taken along the line 22—22 of FIG. 19.

FIG. 23 depicts a view taken along the line 23—23 of FIG. 21.

FIG. 24 depicts a partial sectional side view of first and second assembly members of the new embodiment of the device in contact with each other.

FIG. 25 depicts a view similar to FIG. 24 and shows first and second assembly members of the device partially united.

FIG. 26 depicts a partial cut-away side view of first and second assembly members of the new embodiment of the device fully united.

FIG. 27 depicts a reduced size partial sectional side view of the carriage member of the second assembly member of the device, the carriage having a carriage sheave like member installed at the forward end thereof, the sheave like member providing means for assuring low friction between the cable and the carriage.

FIG. 28 depicts a partial sectional side view of the inset, the inset having a sheave installed at the forward end thereof, the sheave providing means for assuring low friction between the cable and the inset.

FIG. 29 depicts a partial top view of FIG. 30.

FIG. 30 depicts a partial cut-away sectional side view of yet another embodiment of the improved invention, the view showing a receivable frame and a receptor.

FIG. 31 depicts a front view of a receptor.

FIG. 32 depicts a plain side view of a coupled receivable frame supported diagonally arranged via means of a support strut abutting a rest means and a receptor for receiving the receivable frame.

FIG. 33 depicts a view similar to FIG. 32, wherein the receptor is in contact with the receivable frame.

FIG. 34 depicts a view similar to FIGS. 32 and 33, wherein the receivable frame is near fully united with the receptor.

FIG. 35 depicts a view similar to FIGS. 32, 33 and 34, wherein a previously diagonally disposed receivable frame is drawn into alignment with the receptor.

FIG. 36 depicts a view similar to FIG. 29 and is a top view of FIG. 37.

FIG. 37 depicts a partial cut-away sectional side view of a receivable frame and a receptor, the receptor having a cable extending there within.

FIG. 38 depicts a fragmentary partial cut-away perspective view of a pivotal spring-return cable guide combined with a receivable frame.

FIG. 43 depicts a cut-away sectional side view of a coupled housing supported diagonally arranged by a brace means abutting a rest means.

FIG. 44 depicts a view similar to FIG. 43, wherein the coupled housing is no longer diagonally arranged and the brace means is clearing the rest means.

FIG. 45 depicts a threesome partial sectional top view of a rest means having the concave shaped end of a brace means abutting and surroundingly engaging an arcuate surface area thereof, the rest means being shaped to form stops which limit the degree of swivel of the abutting brace means.

DETAILED DESCRIPTION OF THE PREFERRED EMBODIMENTS OF THE IMPROVED INVENTION

Figure 5:
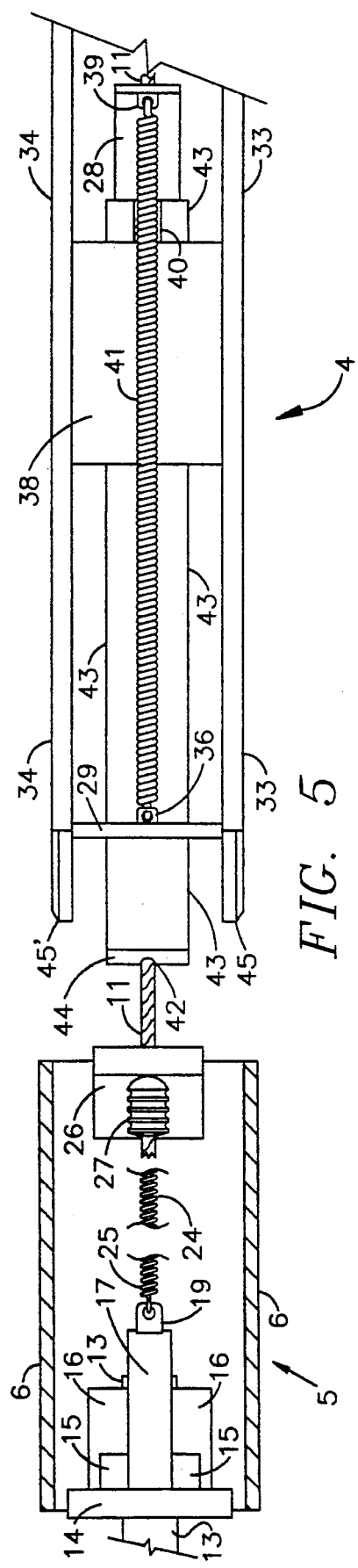
FIG. 5 depicts a partial sectional top view of FIG. 6.

A recreational vehicle having an embodiment of a separable trailer tongue combined therewith and a pickup truck for hauling the RV are best shown in FIG. 1. Although a truck and RV are illustrated in the example, this is shown purely by way of example. As used hereinafter in the description, the terms "rest means" are intended to apply to any device that supports a brace or strut, or any like kind device and particularly to apply to my cylindrical lug described in U.S. Pat. No. 5,005,852. The term "cable" is intended to apply to any suitable flexible line. The terms "winch means" are intended to apply to any type winch which is combined with the invention. However, no prior art winch means will be shown in the drawings. The term "trailer" is intended to apply to any trailing vehicle and the term "tongue" is intended to apply to any type tow bar.

Referring now to the drawings, FIGS. 5, 6 and 10-17 show an easily provided rigid angular shaped metal cable prop 26 combined with and fixedly attached within a first assembly housing 6. The first assembly housing 6 is somewhat elongate and preferably of a tubular construction of a substantially rectangular cross section. The cable prop 26 is laterally centered within and at the rear most end of the housing 6, the prop 26 being fixedly attached, preferably by welding means, upon the inner top surface of a bottom wall of the housing 6. The prop 26 is replacing the frame and components of the frame described in my U.S. Pat. No. 5,005,852. As shown, a rearward facing inclined surface area of the cable prop 26 slightly protrudes from within the rear opening of the housing. Conventional means for connecting an end of a cable 11 to the prop 26 so that the cable 11 extends rearward from within a near central location at the rear opening of the housing 6 is preferably accomplished by simply inserting an end length of the cable through an arcuately formed aperture arranged through the cable prop 26 and then crimping a compression type cable crimp 27 about the end length of the cable extending in a forward direction from within the aperture. The aperture is suitably inwardly beveled to prevent fraying of the cable.

Figure 16:
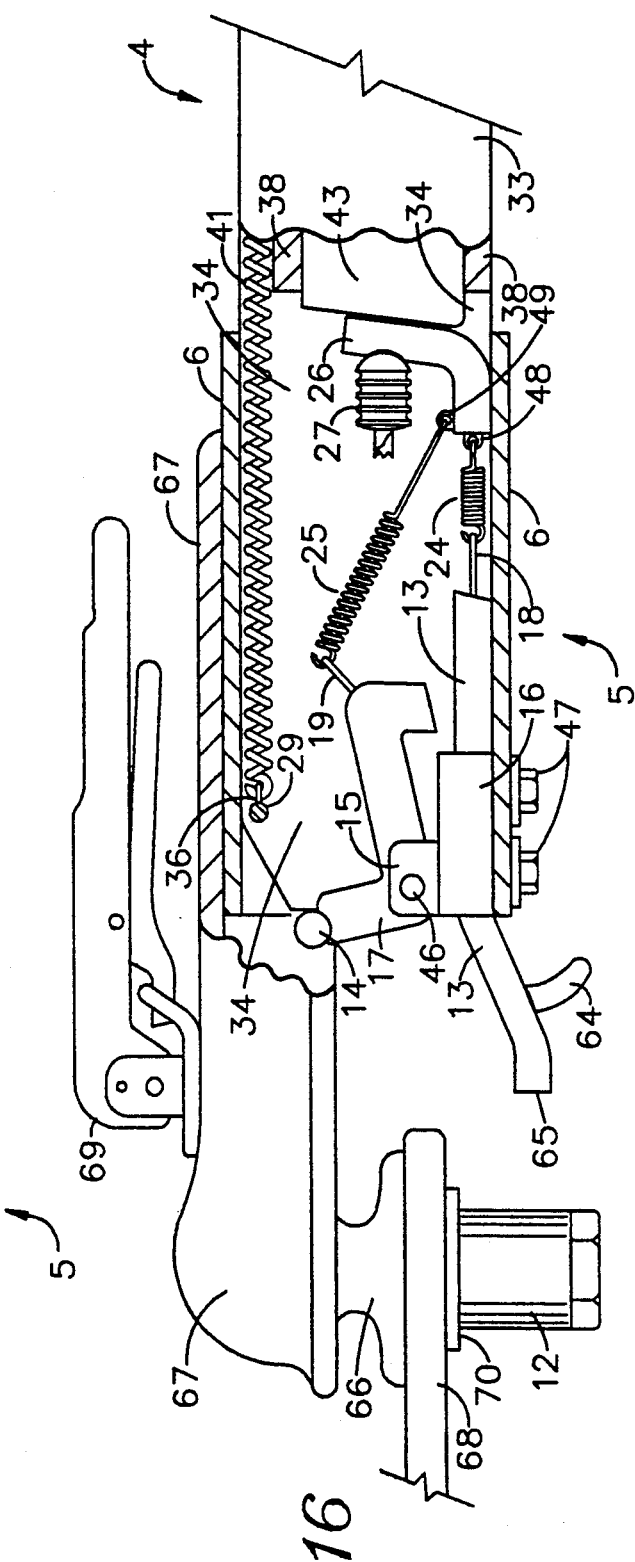
FIG. 16 depicts a partial cut-away sectional side view of fully united first and second assembly members of the device wherein a conventional coupler member of the well known ball and coupler trailer hitching method is combined with the first assembly housing member of the device, and wherein the modified brace member of the first assembly housing is retracted clearing the special cylindrical shaped lug, the lug being understood as a rest means.
Figures 17, 18:
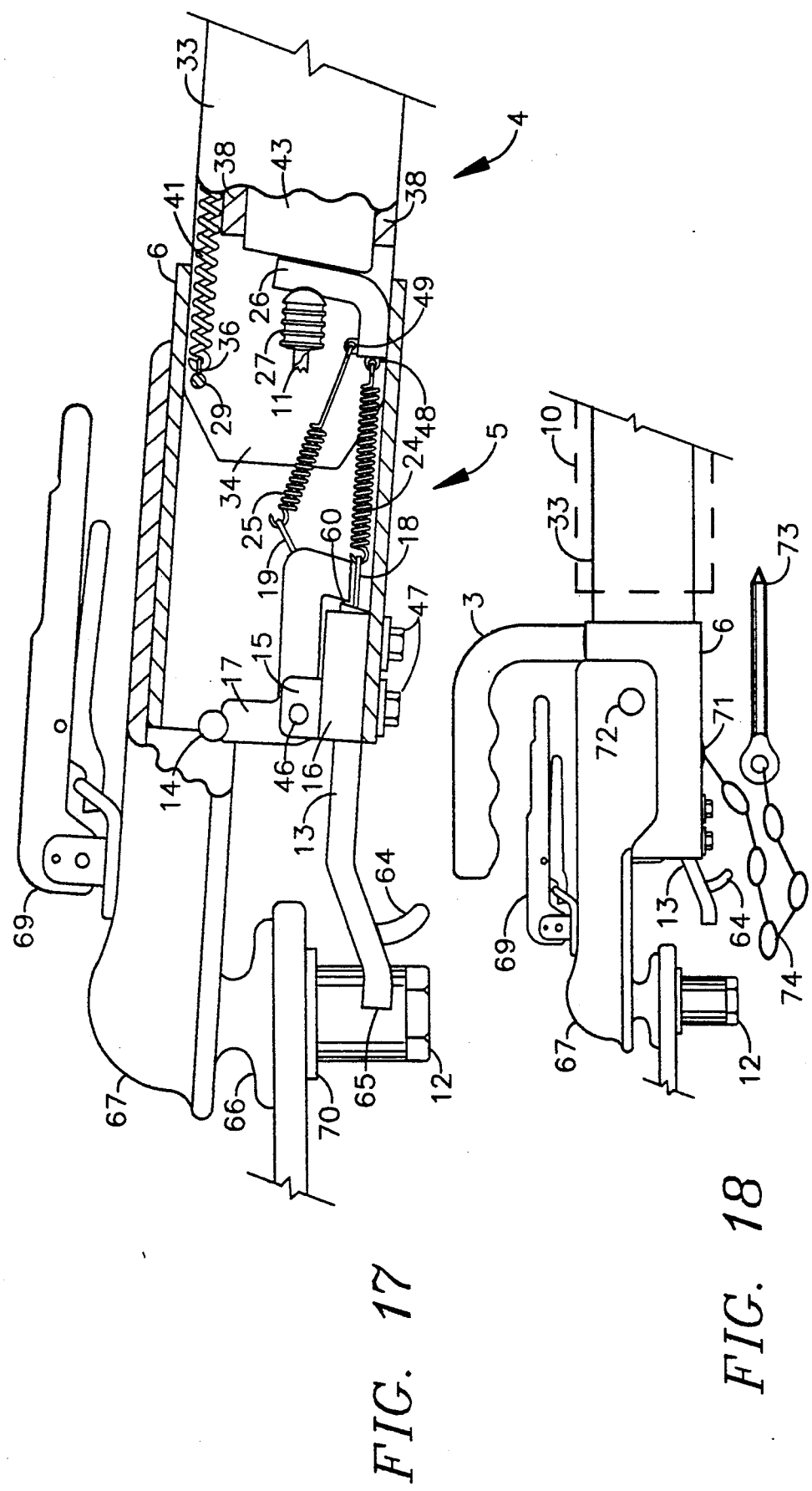
FIG. 17 depicts a view similar to FIG. 16 wherein the modified brace member of the first assembly housing is abutting the rest means.
FIG. 18 depicts a reduced size partial plane side view of the device wherein the well known simple locking pin means is employed to assure that fully united first and second assembly members of the device are safely locked together, and wherein a handle is combined with the first assembly member of the device.

Viewing FIG. 17, shown is a brace means for supporting a towing vehicle coupled housing 6 such that the coupled housing 6 is supported slanting downward from the vehicle (vehicle not shown). As shown, a brace retainer 16 is laterally centered and fastened upon a forward most inner top surface of the bottom wall of the housing 6 with machine bolts 47 which enter drill holes through the housing 6 and screw into inner threaded receiving holes located at the underside of the brace retainer 16 such that the retainer is fixedly attached within the housing. An extendable spring retracted modified brace 13 has a length thereof slidingly captured within an undercut longitudinally arranged channel of the brace retainer 16 and upon an inner top surface area of the bottom wall of the housing 6. A pivotal shaft supported clasp 17 integral with a preferred elongate rod shaped nudge 14 is secured interposed between clasp support member 15, 15' of the brace retainer 16 by having end lengths of the shaft 46 that supports the pivotal clasp 17 rigidly secured within laterally arranged and aligned apertures drilled through the clasp 17 and the clasp support members 15, 15' of the brace retainer 16. As shown, the clasp 17 is basically pivotally mounted upon the retainer. The nudge 14 integral with the clasp 16 is preferably welded to the upper end of an upwardly bent section of the clasp 17, the length of the nudge 14 being transversely arranged and laterally centered within the housing 6, the nudge 14 forming a cross tee member of the upwardly bent section to the clasp 17. A rear length, or section, of the clasp 17 is downward bent and shaped to form a locking means so that the clasp 17 will unyieldingly lock onto an inclined rear end surface area 60 of the modified brace 13, the downward bent section of the clasp 17 having an inclined surface area flushly mating with the inclined surface area 60 of the modified brace 13, the modified brace being extended to a forward position within the brace retainer. A finger grip 64 depending from the protruding end of the modified brace 13 provides means for manually pulling the modified brace 13 to a locked extended position. A helical tension spring 25 having a first end thereof hooked onto a tab member 19 of the clasp 17 and having a second end thereof hooked onto a tab member 49 of the cable prop 26 tends to maintain the clasp 17 locked onto an extended modified brace 13. Another helical tension spring 24 having a first end thereof hooked onto a tab member 18 of the modified brace 13 and having a second end thereof hooked onto another tab member 48 of the cable prop 26 retracts the modified brace 13 whenever rotation of the clasp 17 causes the clasp to unlock from the modified brace 13. Viewing FIG. 17, a protruding forward length of the modified brace 13 is suitably bent, curved and shaped such that a forward distal concave shaped end 65 of the extended modified brace 13 is abutting and surroundingly engaging a rest means 12, the rest means 12 being fixedly attached to and depending from a vehicular mounted coupler means. As shown, the rest means 12 is basically combined with the vehicle for supporting the extended brace. Viewing FIG. 16, shown is a hereinafter further described second assembly bar 34 being received within the housing 6 such that a forward edge of the bar 34 comes into dynamical contact with the nudge 14 causing the clasp 17 to rotate, the rotation of the clasp 17 resulting in the locking means of the clasp 17, or the clasp 17, unlocking the modified brace 13, the modified brace retracting and clearing the rest means 12. For clarity in the drawings, only one 34 of the two bars 33, 34 is shown within the housing and the bars 33, 34 are similar to the bifurcated bars described in my above referred to U.S. patent. As best shown in FIGS. 16 and 17, the brace means comprises the rest means 12, the retainer 16, the brace 13, and the clasp 17 integral with the nudge 14, and as shown in FIGS. 43 and 44, the brace means is a simple cantilevered brace 160 integral with the housing 6 and a rest means 12 combined with the vehicle, or coupling components 68, 66 of the vehicle, for supporting the brace 160 which is abutting the rest means. The brace clears the rest means 12 when the housing 6 is aligned with the bars 33, 34, FIG. 44. It is to be understood that the above mentioned brace retainer 16, modified brace 13 and clasp 17 are replacing the bracket, brace and V-shaped lever described in my above referred to U.S. patent.

Viewing FIGS. 5, 6, 8, 9, 10, 12 and 14, one apertured appendage 38 is shown combined with the second assembly bars 33, 34, the appendage 38 being integral with, and interposed between, the bars 33, 34. The appendage 38 replacing the two longitudinally spaced-apart blocks described in my above mentioned U.S. patent. The aperture through the appendage is preferably rectangular shaped. An elongated somewhat channel shaped carriage 43 having a substantially rectangular cross section, and having a carriage stop 40 fixedly attached upon a top rear end surface area thereof is shown combined with the bars 33, 34 via being slidingly disposed through the aperture of the apertured appendage 38 such that the carriage will slide within the appendage, the carriage stop 40 limiting a forward displacement of the carriage 43 within the appendage 38 by coming into contact with a rear surface area of the appendage, the carriage being displaced to a forward position within the appendage. As shown, the carriage 43 is formed such that the forward end thereof is a slightly inclined carriage face plate 44. The carriage face plate 44 has a near medially arranged cable receiving aperture 42, or opening which is a cable receiver means, drilled therethrough, and disposed below the cable receiving aperture, another, or second, aperture 51 is drilled therethrough for receiving an end length and forward end of a hereinafter described linkage 50, or rod 50, member of a linkage means for rotating a hereinafter described carriage latch means. The inclined face plate 44, or forward most end, of the carriage 43 slightly protrudes beyond the forward edges of the bars 33, 34. The carriage 43 is replacing the slide rod of my above mentioned U.S. patent. The cable 11 is shown extending from the cable prop 26 to the carriage 43 such that a length of the cable 11 is disposed through the cable receiver means 42 for receiving the cable through the forward end of the carriage at the forward end of the carriage 43, the cable, extending through the forward end of the carriage, further extending through the channel of the carriage and onward to winch means.

Figure 6:
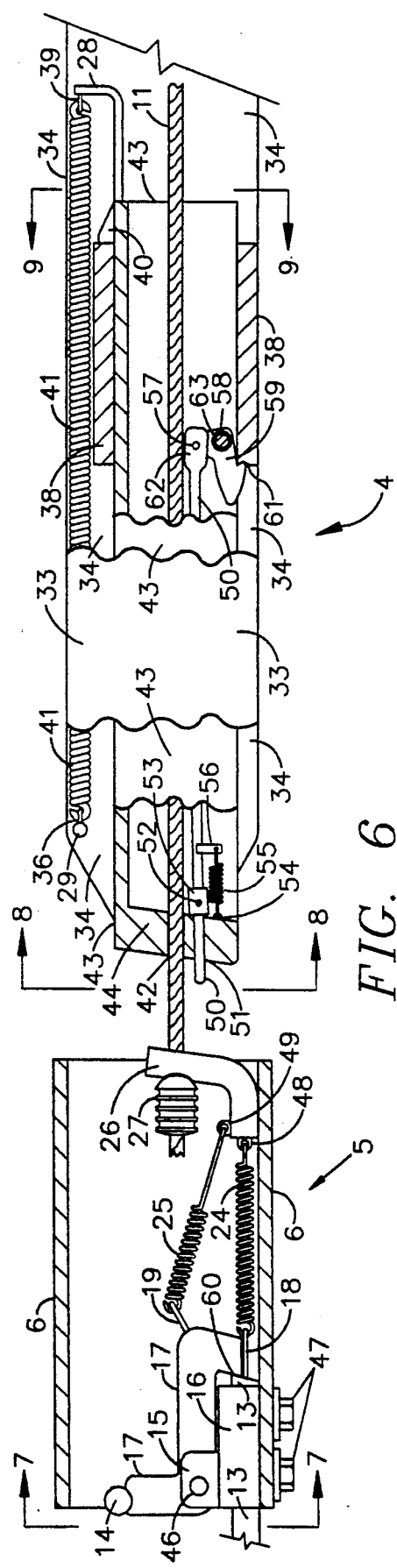
FIG. 6 depicts a cut-away partial sectional side view of first and second assembly members of an improved device.
Figure 15:
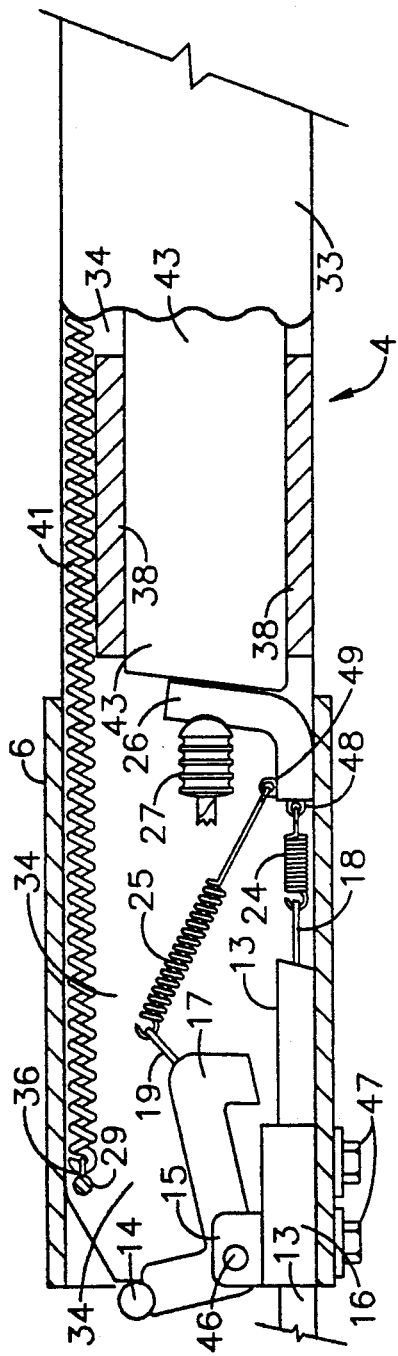
FIG. 15 depicts a view similar to FIG. 14 wherein the first and second assembly members of the device are fully united.

As best shown in FIGS. 5 and 6, a helical tension spring 41 is shown having an end thereof hooked onto, or attached to, a tab 36 member of a transversely arranged cross rod member 29 of the bars 33, 34 and having the other end thereof hooked onto a tab 39 member of a tab support 28, the tab support 28 being a rearward protruding and cantilevered member of the carriage 43. As shown, the spring basically has one end thereof attached to the tab member of the bars and the other end thereof attached to a tab member of the carriage. The helical tension spring 41 is providing elastic means for keeping the carriage 43 displaced to a forward position within the appendage 38, the spring 41, or course, being stretched (FIG. 14) when the carriage 43 is, as hereinafter described, forced to slide rearward within the appendage 38. It should be understood that the slidable carriage 43 is always in longitudinal alignment with the bars 33, 34 and thus the carriage 43 is also in longitudinal alignment with the second assembly 4.

FIGS. 6, 9, 10 and 12 show a latch means which locks onto the appendage 38. The latch means comprises a pivotal carriage latch 59 for locking the carriage 43 by locking onto an inclined forward most bottom edge 61 of the appendage 38 when the carriage 43 is displaced to a forward most arrangement or position within the appendage 38, the carriage latch 59 being a member of the slidable carriage 43. Viewing FIGS. 9 and 10, the carriage latch 59 is pivotally mounted on a carriage latch shaft 58. The latch shaft 58 is transversely arranged and secured within the channel of the carriage 43 by having end lengths thereof rigidly secured within transversely arranged and aligned apertures drilled through the carriage (FIG. 9). Preferred Truarch snap rings 63, 63" provide means for securing the latch shaft 58 end lengths within the apertures and provide means for securing the pivotal carriage latch 59 medially arranged about the latch shaft 58. Also shown is the linkage 50, or linkage rod 50, combined with the carriage latch 59, the linkage 50 having bifurcated rear end members 62, 57 thereof, the carriage latch 59 having a portion thereof interposed between the rear end members 62, 57, FIG. 9, of the linkage 50, the linkage 50 being pivotally secured in place by a simple pin 57, the pin 57 being secured within transversely arranged and aligned apertures drilled through the bifurcated members 62, 57 of the linkage 50 and drilled through the latch 59. As shown, a rearward directed displacement of the linkage 50 will force the carriage latch 59 to rotate, or pivot, and disengage the inclined forward bottom edge 61 of the appendage 38 unlocking the previously locked carriage 43. The unlocked carriage 43 is now free to slide rearward within the appendage 38.

As shown, a forward length of the linkage 50 is disposed through the linkage aperture 51 arranged through the carriage face plate 44 so that a protruding forward end of the linkage 50 coming into dynamic contact with the prop 26 causes a rearward displacement of the linkage 50 resulting in the mentioned rotational movement of the carriage latch 59.

A helical tension spring 55, the spring 55 having an end thereof hooked onto a tab 54 that is secured to the back side of the carriage face plate 44, the other end of the spring 55 being hooked onto a tab member 56 of the linkage 50, tends to maintain the linkage 50 displaced to a forward position such that the before mentioned forward end of the linkage 50 protrudes from within the aperture 51 due to spring tension upon the linkage 50. The degree of displacement of the linkage 50 and thus the degree of rotation of the carriage latch 59 is made adjustable via having a conventional type annular slide-on linkage clamp 53 surroundingly engaging the linkage 50, the clamp 53 having a clamp securing screw 52 for securing the clamp 53 at a practical and functional point along the linkage 50. The clamp 53 is precisely limiting the forward displacement of the linkage 50 and thereby accurately setting the degree of clockwise rotation of the carriage latch 59 when the properly adjusted clamp 53 engages the back side of the carriage face plate 44, the carriage face plate providing a stop for the clamp 53. The forward end, or nose, of the carriage latch 59 is arcuately formed such that when the carriage latch 59 as a traveling member of a forward moving, or forward sliding, carriage 43 engages the rear bottom edge of the appendage, the rear bottom edge of the appendage 38 will cammingly bias the carriage latch 59 clockwise about the shaft 58 to permit the carriage latch 59 to enter the aperture of the appendage, the bottom of the carriage latch 59 skidding along the inner top surface of the bottom portion of the appendage 38.

Viewing FIG. 10, winch means, by drawing the cable, will draw the composite second assembly 4 towards the composite first assembly and initiate bringing about the longitudinal alignment of the assemblies 4,5. Continued drawing of the cable 11 will draw the aligning assemblies through a point wherein the second assembly 4 is further aligned with and lifted towards the first assembly 5. Viewing FIGS. 11, 12, continued drawing of the cable 11 will bring the second assembly carriage face plate 44, or forward end of the carriage, into contact with the first assembly prop 26 and force a rearward displacement of the linkage 50, the forward protruding end of the linkage at some point abutting the prop 26, the rearward displacement of the linkage 50 causing the carriage latch 59 to rotate and unlock from the carriage 43. Viewing FIGS. 13 and 14, continued drawing of the cable 11 will force the second assembly bars 33,34 to be received within the first assembly housing 6 as the carriage 43, the forward end thereof abutting the prop 26, is forced to slide rearward, against spring tension, within the apertured appendage 38, the bars forking the prop 26 and all internal components of the housing 6 except the nudge 14. The bars 33,34 entering the housing 6 forces the housing 6 to rotate until becoming longitudinally aligned with the bars and the second assembly.

Viewing FIG. 16, just prior to the complete registration of the bars 33.34 with the housing 6, forward edges of the bars 33.34, or an edge of the bars 33,34, contact and move the nudge 14 causing the clasp 17 to rotate, or pivot, unlocking the modified brace 13 by unlocking from the modified brace, the modified brace 13 retracting and clearing the rest means 12. The first and second assemblies 4,5 being united.

Viewing FIG. 18, a preferred and very common means for assuring that the assemblies 4,5 remain united when it is imperative that they remain united is shown wherein, the housing 6 has apertures in it aligned with apertures in the bars and locking pin 73 is removably receivable within the aligned apertures 72. The locking pin 73 is attached to a link 74 which in turn is secured 71 to the housing to prevent the pin from inadvertently becoming separated from the housing.

Viewing FIG. 27, means for providing low friction between the cable 11 and the carriage face plate 44 and the carriage 43 in general is accomplished by having the cable 11 train along a shaft 113 supported carriage sheave 112, or sheave like means 112, the carriage sheave like means 112 being combined with the carriage 43 and becoming an alternate cable receiver means for receiving the cable through the forward end of the carriage 43.

Viewing FIGS. 16 and 17, shown are two versions of a first assembly 5 such that the first assembly housing 6 integral with handle 3 and a coupler 67 has the handle 3 of the first assembly housing 6 removed (FIG. 17) from the first assembly housing 6 making the first assembly housing 6 less massive and cumbersome.

Obviously the improved invention thus far described has new components combined therewith, several of the new components being fundamental analogies of the original components.

A first new embodiment of the invention will now be described. Components of the new embodiment of the invention are to be understood as being combined with a separable trailer tongue.

Viewing FIG. 19, a partial alternate first assembly 75 and a partial alternate second assembly 76 are depicted.

It is to be understood that the alternate first assembly 75 housing 99 is to be combined with a coupler 67 or a coupling device as shown combined with the first assembly housing 6, FIG. 17 and, therefore, an acceptor 99 member of the assembly 75, the acceptor being somewhat comparable to the previously described housing 6, is integral with a coupler means for coupling the forward end of the acceptor to a towing vehicle. The somewhat elongated acceptor 99 is comparable to the hereinbefore described first assembly housing 6 in that the acceptor 99 is preferably of a tubular construction of a substantially rectangular cross section and the acceptor 99 has an opening at the rear end thereof. Viewing FIGS. 19 and 22, a somewhat elongated base 91 having the cross section thereof shaped to form an inverted "T" is combined with the acceptor 99 and is within the acceptor 99, the base 91 being laterally centered and fastened upon the rearmost inner top surface of the bottom wall of the acceptor 99 with machine bolts 109 which enter drill holes through the acceptor 99 and screw into inner threaded receiving holes located at the underside of the base 91. A cable stay comprising two somewhat rectangular shaped laterally spaced apart cable stay plates 83,83', or side members 83,83' of the stay, having rounded corners is pivotally mounted upon the base by being pivotally mounted to an upstanding member 90 of the base 91 and therefore the stay is basically pivotally mounted upon the base. A stay pivot shaft 84 is lengthwise transversely arranged having a medial length thereof placed across the upstanding member 90 of the base 91 and within a transverse groove of the upstanding member 90 of the base 91, and having the length thereof within the groove of the upstanding member 90 of the base preferably welded in place. Protruding end lengths, or wings, of the pivot shaft 84 are disposed within transversely arranged and aligned apertures drilled through the plates 83,83', the plates having been individually placed on the pivot shaft 84. When viewing the stay in an upright position as shown in FIG. 19, the pivot shaft 84 is disposed at the near lower forward corner of the stay. A stop shaft 86 member of the stay is secured interposed between the stay plates 83,83' by having end lengths thereof disposed and tac welded within transversely arranged and aligned apertures drilled through the stay plates, the stop shaft 86 being disposed at the lower rearward corner of the stay and rearward of the pivot shaft 86 As best shown in FIGS. 19 and 24, the stop shaft 86 limits the degree of rotation of the stay such that the length of the stay or the stay is limited to a near perpendicular arrangement with respect to the base 91. As shown, the stop shaft 86 comes into contact with a rear upper surface area of the upstanding member 90 of the base 91, this upper surface area of the base 91 being provided by a notched-out rear upper corner of the upstanding member 90 of the base 91. It is important to notice that rearward facing surface areas of the stay, or the stay plates 83,83', slightly protrude from within the rear open end of the acceptor 99 when the stay is near perpendicularly arranged with respect to the base 91. It may be generally stated that the stay slightly protrudes from within the opening at the rear end of the alternate first assembly 76 or the alternate first assembly acceptor 99. Helical tension springs 88,88' tend to keep the stay in an upright position and near perpendicularly arranged with respect to the base 91. A first spring 88 is installed on the near side of the base and a second spring 88' is installed on the far side of the base, the springs being somewhat longitudinally arranged and disposed interposed between upper facing surface areas of a base plate of the base 91 and downward facing surface areas of the stray plates 83,83'. A length of the upstanding member 90 of the base 91 is sandwiched by inward facing surface areas of lower portions of the upright stay plates 83,83'. First ends of the springs 88,88' are hooked onto tabs depending from the bottom surfaces of the stay plates 83,83' and second ends of the springs are hooked onto tab members of the base. It should be noticed that the cable 77 also tends to maintain the stay perpendicularly arranged with respect to the base 91 by having a downward tensioned length thereof resting against the stop shaft 86 member of the stay. Hereinafter, it will become evident that the stay is simply a spring loaded swivel member of the base 91, the stay providing means for assuring that the cable 77 extends from at least a near laterally centered point within the opening at the near end of the acceptor 99.

FIGS. 19 and 20 show means for having an end of the cable 77 connected to a forward end of the acceptor 99. A cable anchor plate 100 having an aperture punched, or drilled, through the center thereof is shown transversely arranged and secured onto the forward end of the acceptor 99 by having rearward facing surface areas of end lengths thereof fixedly attached, preferably by welding means, to forward facing surface areas of side wall members of the acceptor 99. An end length of the cable 77 extending forward from within the aperture of the cable anchor plate 100 has a compression type cable crimp 101 crimped thereto, the crimp 101 and anchor plate 100 providing means for connecting the cable 77 to the acceptor 99. As best shown in FIGS. 19 and 22, the cable 77 extends rearward from the cable anchor plate 100, the cable 77 having a length thereof disposed interposed between the stay plates 83,83', or side members 83,83' of the stay. The cable 77 is supported by and resting upon a cable support shaft 85. The cable support shaft 85 is secured interposed between the stay plates 83,83' by having end lengths thereof disposed and tac welded within laterally arranged and aligned apertures drilled through the stay plates. When viewing the stay arranged perpendicular with respect to the base 91, the cable support shaft 85 is shown disposed a little above and between the stay pivot shaft 84 and the stop shaft 86. Viewing FIG. 22, upper inward facing corners of the stay plates 83,83' are smoothly rounded so that a length of the cable 77 will be captured between the plates when the stay rotates from a horizontal position, FIG. 25, towards a vertical or upright position, FIG. 24. Notice that the horizontally arranged or counterclockwise rotated stay is resting upon a stop block 92 member of the base 91. As shown, the stay is basically guiding the cable 77 which is connected to the acceptor 99 and extending from within the opening at the rear end of the acceptor.

Viewing FIGS. 19, 21, 23, 24 and 25, the alternate second assembly 76 elongate inset 110 is somewhat channel shaped by having a longitudinally arranged channel along the underside thereof and has outer surface areas registrable with inner surface areas of the acceptor 99, the channel of the inset 110 being formed along the full length and the underside of the inset 110. With the exception of the forward most blunt end 82 of the inset 110, the forward end of the inset is both beveled 81 and tapered 81 so that the forward end of the inset 110 and the inset in general are, without snagging the acceptor 99, receivable within the opening at the rear end of the acceptor 99 and generally receivable within the acceptor 99. Although herein described as being a member of the alternate second assembly 76, the inset 110 is to also be considered as being combined with the second assembly 4 such that the inset 110 is replacing the second assembly bifurcated bars and slide rod described in my above mentioned U.S. patent.

The cable 77 is extending rearward from within the acceptor 99, a length thereof being disposed interposed between the cable stay plates 83,83', or side members 83,83' of the stay, and training upon the cable support shaft 85 and the stop shaft 86. The cable 77 now extends from the stay plates 83,83' and has a length thereof disposed through cable receiver means 78 for receiving the cable through the forward end of the inset at the forward blunt end 82 of the inset 110 and onward to the winch means. The cable receiver means 78 at the forward end 82 of the inset 110 is an aperture 78 drilled longitudinally through the blunt end of the inset, the aperture 78 being inwardly beveled to prevent fraying of the cable 77, the forward blunt end 82 of the inset 110 being disposed above the forward open end of the channel of the inset. The cable extends rearward from within the cable receiver means of the inset to within an elongated cable lay groove 80 provided medially along the inner downward facing surface of the channel of the inset. The cable lay groove 80 is basically a channel within a channel. The cable extends from within the cable lay groove of the inset to winch means.

Viewing FIGS. 19 and 20, an alternate brace retainer 109 is laterally centered and fastened upon a forward most inner top surface of the bottom wall of the alternate first assembly acceptor 99 with machine bolts 108 which enter drill holes through the acceptor 99 and screw into inner threaded receiving holes located at the underside of the alternate brace retainer 109. The alternate brace retainer 99 is comparable to the hereinbefore described brace retainer 16. An extendable retractable alternate brace 102 has a length thereof slidingly captured within a longitudinally arranged lower channel of the alternate brace retainer 109 and upon the inner top surface of the bottom wall of the acceptor 99. A pivotal alternate brace clasp 105 integral with a alternate clasp nudge 107 is secured between the alternate brace clasp supports 103,103' by having end lengths of the shaft 104 of the alternate brace clasp 105 rigidly secured within laterally arranged and aligned apertures drilled through the alternate brace clasp supports 103,103'. The clasp 105 is basically pivotally mounted upon the retainer. The alternate clasp nudge 107 member of the alternate brace clasp 105 is preferably an elongate rod forcefully inserted within a transversely arranged aperture drilled through a forward end of the alternate brace clasp 105 such that the alternate clasp nudge 107 is rigidly secured to the alternate brace clasp 105, the alternate clasp nudge 107 being laterally centered within the acceptor 99 and forming cross tee member of the alternate brace clasp 105. A rear length or section of the alternate brace clasp 105 is downward bent and shaped to form a locking means so that the alternate brace clasp will unyieldingly lock onto an inclined rear end surface area 106 of the alternate brace 102, the downward bent section of the alternate clasp 105 having an inclined surface area flushly mating with the inclined surface area 106 of the alternate brace 102, the alternate brace being extended to a forward position within the acceptor 99. A helical tension spring 94 having a first end thereof hooked onto a tab member 95 of the alternate brace clasp 105 and having a second end thereof hooked onto a tab member 93 of the base 91 tends to maintain the alternate brace clasp 105 locked onto an extended alternate brace 102. Another helical tension spring 96 having a first end thereof hooked onto a tab member 97 of the alternate brace 102 and having a second end thereof hooked onto the tab member 93 of the base 91 retracts the alternate brace 102 whenever a rotational movement of the alternate brace clasp 105 causes the alternate brace clasp to unlock from the alternate brace 102.

Winch means, by drawing the cable 77, draws the inset 110 to the acceptor 99 such that the upper forward edge of the channel of the inset 110 comes into contact with the stay 83. It is important to notice that the length of cable 77 within the acceptor 99 and disposed interposed between the stay plates 83,83' does not experience any appreciable degree of longitudinal or lateral movement during winching operations. Continued drawing of the cable 77 forces the stay to rotate against spring tension, the rotating stay experiencing downward directed forces normally associated with tow bars, or trailer tongues, the rotated stay 83 and the base 91 being received into the channel of the inset 110, the inset being received into the acceptor 99 by entering the opening at the rear end of the acceptor 99 when the assemblies are being united. The acceptor 99 becomes aligned with the inset 110 as the inset is being received into the acceptor.

Viewing FIG. 26, shown is the inset 110 via winch means being near fully received within the acceptor 99 such that a forward edge of the forward moving inset 110 comes into contact with the alternate clasp nudge 107, movement of the alternate clasp nudge causing the alternate brace clasp 105 to rotate unlocking the clasp 105 from the alternate brace 102, the alternate brace retracting and clearing the rest means 12, FIG. 18, the acceptor 99 and inset 110 being united, the alternate first assembly 75 and the alternate second assembly 76 being united.

In a manner similar to the hereinbefore described means for using a simple locking pin to safely secure the united housing and bars and the hereinafter described means for using a simple locking pin to safely secure hereinafter described united receivable frame 116 and receptor 117 components, a locking pin 73 is to be understood as being removably receivable within aligned apertures 72 transversely arranged through the acceptor and the inset (compare FIGS. 18 and 35).

It is to be understood that protruding forward lengths of the alternate brace 102 and the previously described modified brace 13 are suitably bent, curved and shaped such that the forward distal ends of the extended braces 13,102 abut a rest means 12, the rest means being fixedly attached to and depending from the vehicular mounted coupling means, the braces being of course members of respective assemblies, the assemblies being combined with coupling means and coupled to a towing vehicle. The forward distal end of the alternate brace is, as described for the modified brace, concave shaped for abutting and surroundingly engaging a rest means. As previously described for the first assembly 5, FIGS. 16, 43 and 44, brace means for supporting the acceptor 99, FIG. 19, comprises the alternate brace retainer 109, the alternate brace 102, the alternate clasp 105 integral with the alternate nudge 107, and a cantilevered brace 160, FIGS. 43 and 44, and the rest means 12, FIGS. 16, 17 and 18 and rest means 165, FIG. 42. (The brace means and coupler means for the acceptor 99 are not fully shown in FIGS. 19 and 26 because they are similar to the brace means and coupler means described for the first assembly.)

Viewing FIG. 28, the previously described aperture at the forward end of the inset, this aperture being a hereinbefore described cable receiver means, is partially replaced by another cable receiver means. This other cable receiver means is an inset sheave 114 for providing low friction between a winching cable 77 and the inset 110, the inset sheave 114 being rotatably shaft 115 mounted at the forward end of the inset 110, end lengths of the shaft 115 being tac welded within a transversely arranged notch means machined along the forward blunt end of the inset.

Referring to FIGS. 1-4 and 32-35, a second embodiment of the separable trailer tongue is described.

Specifically viewing FIGS. 29-32, a somewhat elongate second assembly receptor 117 having a top wall and side walls, the receptor being shaped to form a channel, is shown having a rotatable shaft 127 mounted receptor sheave 128 disposed upon the top wall 131 thereof and having a cable mainstay 136 disposed below an open forward end thereof. The shaft 127 about which the receptor sheave 128 is mounted has end lengths thereof disposed within apertures which have been drilled, or punched, through the shown laterally spaced apart and receptor top wall 131 mounted receptor sheave supports 129, 129', the shaft 127 being laterally arranged relative to the receptor 117 and arranged such that the receptor sheave 128 mounted thereabout is disposed laterally centered relative to the receptor top wall 131, and such that the forward most periphery of the receptor sheave 128, or the receptor sheave in general, slightly protrudes beyond the forward most end of the receptor 117. A slot 130 having an open end at the forward edge of the receptor top wall 131 is disposed interposed between the receptor sheave supports 129, 129', the open ended slot 130 being vertically arranged through the receptor top wall 131. As shown, the receptor sheave is basically secured to the receptor such that the receptor sheave is disposed at the upper forward end of the receptor. The mainstay 136 is essentially a transverse rigid bar member of the receptor 117, the mainstay having rearward facing surface areas of the end lengths thereof preferably welded to lower forward facing surface areas of the mainstay supports 134, 134', the mainstay supports being preferably welded to downward facing forward surface areas of the receptor side walls 172, 173. And end length of the cable 125 is inserted through a medially arranged aperture 137 drilled, or punched, through the mainstay 136, the end length of the cable having a preferred compression type crimp 135 compressed thereabout, the crimp 135, in conjunction with the mentioned mainstay 136 and mainstay supports 134, 134', providing means for connecting the cable 125 to the lower forward end of the receptor. The cable 125 trains about the receptor sheave 128, a length thereof being maintained sufficiently aligned with the grooved rim of the receptor sheave 128 by extending interposed between inner facing surface areas of the sheave supports 129, 129' and via extending through the slot 130. The forward facing edges of the receptor top and side walls are beveled 174, or tapered for the purpose of facilitating the receptor's initial receiving of rounded, beveled, or tapered, rearward facing edges of a hereinafter described first assembly receivable frame 116 integral with a coupler means for coupling the forward end of the frame to a towing vehicle.

Understand that persons skilled in the art will have knowledge applicable to numerous means for combining the receptor described in the previous paragraph with a conventional trailer tongue 10 or tow bar. Perhaps necessarily mentioned, the receptor 117 replaces the second assembly bifurcated bars, blocks and slide rod described in my U.S. Pat. No. 5,005,852.

Continuing to view FIGS. 29, 30 and 32, understanding FIGS. 29 and 30 to be partial cut-away views, the first assembly receivable frame 116 is shown having laterally spaced apart receivable frame side walls 120, 121, the side walls having at least two stacked receivable frame draw sheaves 133, 118 and a receivable frame lift sheave 123 disposed interposed therebetween. As shown, the lift sheave is disposed at the upper rear end of the frame and the two draw sheaves are disposed forward of the lift sheave. The receivable frame sheaves are rotatably mounted about transversely arranged respective shafts 132, 119, the shafts having end lengths disposed within transversely aligned apertures drilled or punched through the receivable frame side walls 120, 121, the side walls including the depending supports 134, 134'. The sheaves are arranged in a coplanar relationship and preferred Truarc snap rings (not shown) maintain the sheaves medially secured about their respective shafts, the end lengths of the shafts disposed within the apertures being preferably welded in place. The lift sheave 123 is disposed rearward of the upper of the two stacked draw sheaves, the periphery of the lift sheave 123, or the lift sheave 123 in general, slightly protruding beyond the rounded, beveled, or tapered, rearmost edges 140, 140' of the receptor frame side walls 120, 121. Upper most peripheries of the lift sheave 123 and the upper 118 of the two stacked draw sheaves are very near aligned with the top edges of the receivable frame side walls 120, 121. Two vertically arranged receptor stops 122, 122' are preferably welded along the outer surfaces of the receivable frame side walls. Cable retaining means 126 assures that a cable 125 will remain trained about the draw sheaves, the draw sheaves, and of course all other described sheaves, having grooved rims.

It should be noticed at this time that the lift 123 and draw sheaves 133, 118 are preferably heavy duty sheaves having substantially wide rims. The lift and draw sheave shafts are capable of withstanding enormous bending forces, the draw sheave shafts 133, 119 being preferably considerably more durable than the lift sheave shaft 124.

As best shown in FIG. 32, a coupled receivable frame 116 has a cantilevered strut 145 integral with the frame 116. A forward distal end 146 of the strut 145 is concave shaped such that the forward end of the strut surroundingly engages and abuts the rest means 144, the rest means providing means for attaching the ball 142 to the ball mount 143, the rest means replacing the special cylindrical nut described in my previously referred to U.S. patent. The strut abutting the rest means supports, or braces, the coupled receivable frame such that the receivable frame is slanting downward, or is diagonally disposed, relative to a towing vehicle (FIGS. 1-4). The strut and the rest means combined with a vehicle for supporting the strut are a brace means for supporting the frame.

Viewing FIGS. 4 and 35, the strut 145 clears the rest means 144 when the frame, or first assembly 116, is aligned with the receptor.

Specifically viewing FIG. 38 with a quick glance at FIGS. 1-4, shown is a spring return pivotal cable guide means 151 for assuring that the cable will train about the lift sheave when the assemblies are being united comprising elongate spaced apart parallel cable retainers 152, 152', or side members 152, 152', the retainers thereof having first ends rigidly joined together by a transverse member 154 of the cable guide means, second ends of the retainers thereof sandwich portions of the lift sheave 123 and are pivotally secured about the lift sheave by having lengths of the lift sheave shaft 124 disposed within transversely arranged and aligned apertures drilled through each of the second ends of the retainers 152, 152'. Preferred triangular shaped leaders 153, 153' are fixedly attached, preferably by welding means, along the inner surface areas of the retainers, the leaders 153, 153' assuring that a length of tensioned cable (cable not shown in FIG. 38) will train within the groove of the groove rimmed lift sheave. Viewing FIGS. 1-3, a length of the cable is disposed between the retainers. Arcuate formed portions of the near first ends of the retainers provide means for having the rotated cable guide means (dashed lines) clear the draw sheave 118 shaft. The retainers of the rotated cable guide means sandwich portions of the draw sheave. An offset elongate tab 155 has a first end thereof preferably tac welded to the cable guide means such that a preferred helical tension spring 156 established between a second end of the offset tab 155 and a receivable frame side wall 120 inner facing surface area installed side wall tab 157 will assure that the perspectively rotated cable guide means 151 is generally maintained somewhat perpendicularly arranged with respect to the top surfaces of the receivable frame. Basically, a spring means is necessary for keeping the retainers near perpendicularly arranged with respect to top surfaces of the frame, and as shown in FIGS. 1-4, the retainers rotate and are received, along with the frame, into the opening at the forward end of the receptor when the assemblies are being united.

It should be understood that winch means tensioning a cable extending between the receivable frame and the receptor, a length of the cable being captured within the limited open space existing between the retainers of the cable guide means, will force a vehicular coupled receivable frame to swivel and will force the receptor to be draw toward the receivable frame, the receivable frame and receptor becoming substantially near longitudinally aligned with each other.

Viewing FIGS. 1-4 and 32-35, wherein the cable is shown extending from the receptor to the frame, training about and looping the draw and lift sheaves, extending from the frame to the receptor, training about the lower periphery of the receptor sheave and extending onward to the winch means. Winch means, by drawing the cable 125, draws the receptor sheave 128, or draws the receptor 117 in general, into contact with the lift sheave 123 member of the downward slanting receivable frame 116, or into contact with the downward slanting receivable frame in general. Continued drawing of the cable forces the receivable frame 116 to be initially received into an opening at the forward end of the receptor for receiving the frame, or into the channel of the receptor 117, as the spring return pivotal cable guide means 151, upon coming into contact with the receptor, is forced to begin rotating, outer surface areas or the receivable frame 116 being registrable with inner surface areas of the receptor 117. Continued drawing of the cable forces the receivable frame to be further received into the receptor via the opening at the forward end of the receptor until top forward facing edges, or an upper forward surface area, of the receptor come into contact with, or abut, the receptor stop members 122, 122' of the receivable frame, the stop members 122, 122' limiting movement of the receptor, the cable guide means having been forced to rotate until disposed interposed between the receivable frame side wall members. Continued drawing of the cable is forcing the downward slanting receivable frame to rotate and become longitudinally aligned with and within the receptor, the receivable frame and receptor being united. The stop members 122, 122' of the frame are basically a receptor stop means.

FIG. 35 depicts locking means for safely locking together the united receivable frame 116 and receptor 117. The receivable frame has transversely arranged apertures 139 through the side wall members thereof aligned with transversely arranged apertures 138 through the receptor side walls and a locking pin 147 is removably receivable within the aligned apertures. The pin is attached to a link 148 which in turn is secured 149 to the receivable frame to prevent the pin from inadvertently becoming separated from the receivable frame.

Figure 39:
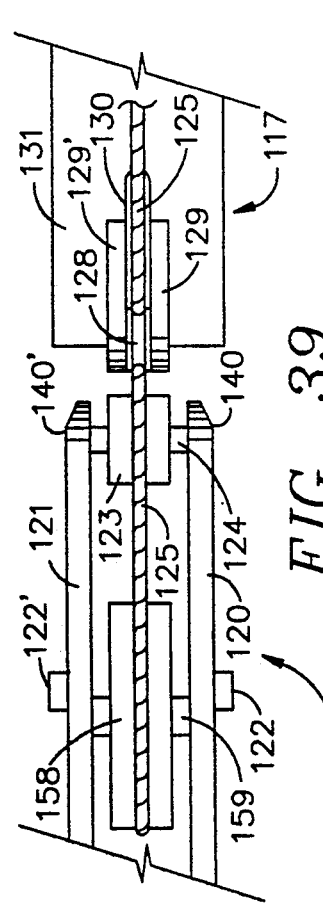
FIG. 39 depicts a top view of FIG. 40.
Figure 40:
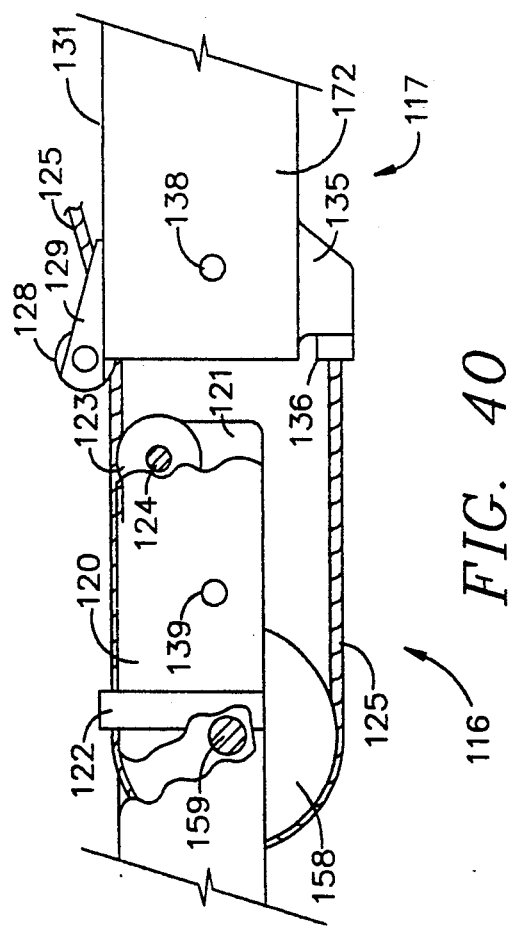
FIG. 40 depicts a partial cut-away side view of a receivable frame having a single sheave replacing two smaller sheaves.

Comparing FIGS. 39 and 40 with FIGS. 29 and 30, it is very apparent that a single draw sheave 158, which is larger than the lift sheave, is replacing the two stacked draw sheaves. The single draw sheave has a larger diameter than the lift sheave 128, the single draw sheave 158 being rotatably mounted between the receivable frame side walls 120, 121 and disposed forward of the lift sheave 123, the single draw sheave being in a coplanar relationship with the lift sheave. The cable 125 is extending from the mainstay 136 member of the receptor 117, training about the single draw sheave 158 then the lift sheave 123, returning extending to the receptor 117, training along the receptor sheave 128, and extending onward to winch means.

Viewing FIGS. 36 and 37, a somewhat altered receptor is shown wherein the cable 125 is extending rearward within the channel of the altered receptor, the altered receptor no longer having a slot. A transverse cable stay 150 is rigidly fixedly attached, preferably by welding means, below the lower periphery of the receptor sheave 128, the cable stay 150 assuring that the cable will train about and remain aligned with the receptor sheave. During winching operations the cable stay 150 is forced to travel over the receivable frame lift sheave 123. The "over the hump" effect as the stay 150 is forced to travel about the periphery of the lift sheave is acceptable.

Figure 41:
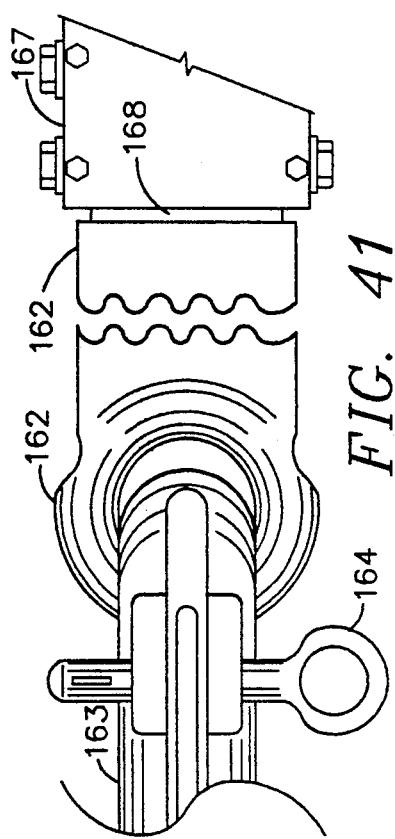
FIG. 41 depicts a coupling means, the particular coupling means being representative of the well know Pentle and Hook coupling device.
Figure 42:
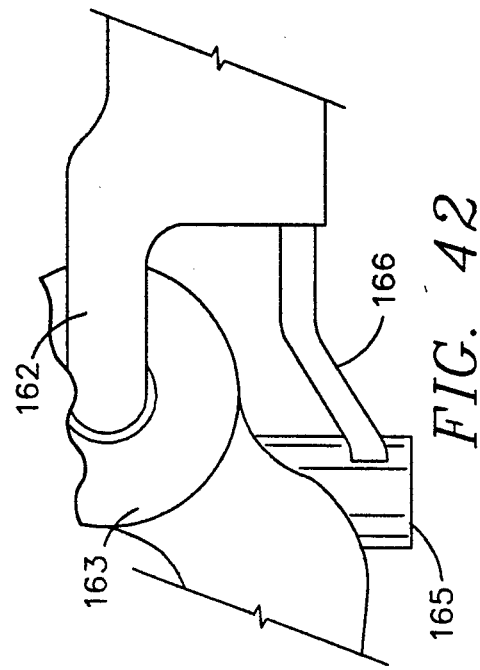
FIG. 42 depicts a partial plain side view of FIG. 41, wherein a brace or strut means is abutting a rest means.

Viewing FIGS. 41 and 42, the well known Pentle Hook and Ring coupling device is shown, the generally selected type having a locking pin 164 associated with the hook. The components 162 and 167 simply represent easily understood elements of my invention. It should be understood that this and other coupling devices can be combined with my invention and improvements thereto. Numerous types of rest devices including the type 165 shown depending from the Pentle Hook can be combined with my invention. Bluntly, there are numerous devices that will provide a coupling means that can be combined with my invention and there are numerous means for providing a rest means for supporting my described modified brace, alternate brace and strut.

Viewing FIG. 45, a rest means 177 is shown having stops 178, 178' which limit the degree of swivel a vehicular coupled component of my invention might experience during winching operations. The component 176 shown having the concave shaped end thereof abutting and surroundingly engaging the rest means 177 is representative of my modified brace and strut.

Viewing FIGS. 43 and 44, a simple cantilevered rigidly secured brace 160 having a concave shaped forward end 161 abutting and surroundingly engaging a rest means 12 is shown combined with the first assembly 5. It is to be understood that a simple cantilevered brace can be combined with any of my vehicular coupled components for the purpose of supporting, or bracing, the components such that the components are disposed slanting downward relative to a towing vehicle. The simple brace 160 is providing means for supporting a vehicular coupled first assembly or a vehicular coupled alternate first assembly so that the assemblies are slanting downward from a towing vehicle.

A person skilled in the art could provide numerous lifting devices for handling the obvious man handled coupling component of the invention.

Massive trailers, or trailer like devices, often require a breaking system. A person skilled in the art could provide vehicle to trailer quick disconnect electrical brakes for a massive trailer. A person skilled in the art could also provide a modified releasably locked hydraulically operated trailer tongue installed braking device in combination with my invention, the hydraulic device being locked during winching operations.

The foregoing description of the preferred embodiments of the invention have been presented for the purposes of illustration and description. It is not intended to be exhaustive or to limit the invention to the precise forms disclosed. Many modifications and variations are possible in the light of the above teaching. It is intended that the scope of the invention be limited not by this detailed description, but rather by the claims appended hereto.

I claim:

1. An improved separable trailer tongue of the type having first and second assemblies which are united by a winch means having a cable connected thereto for drawing said assemblies together and means for assuring that said assemblies remain united, said first assembly including a first assembly housing integral with a coupler means for coupling the forward end of said housing to a towing vehicle, said second assembly including second assembly bifurcated bars which are received into said housing by entering an opening at the rear end of said housing, said bars forking internal components of said housing when said bars are within said housing, wherein the improvement comprises:

(a) a prop combined with and fixedly attached within said housing, said prop having said cable also connected thereto;
   (b) a brace means for supporting said housing such that said housing is supported slanting downward from said vehicle; said housing being coupled to said vehicle;
   (c) an appendage combined with and interposed between said second assembly bars;
   (d) a carriage disposed through an aperture of said appendage such that said carriage will slide within said appendage;

(e) a stop means for limiting forward displacement of said carriage within said appendage, said carriage being displaced to a forward position within said appendage; and (f) a cable receiver means for receiving said cable through the forward end of said carriage, said cable extending from said prop and through the forward end of said carriage and onward to said winch means.

2. The device of claim 1 wherein, when said assemblies are being united, the forward end of said carriage abuts said prop, said carriage sliding rearward within said appendage, said bars being received into said housing as said carriage is sliding rearward within said appendage, said slanting housing supported by said brace means becoming aligned with said bars as said bars are being received into said housing.

3. The device of claim 2 wherein said brace means comprises a cantilevered brace integral with said housing and a rest means combined with said vehicle for supporting said brace, said brace abutting said rest means, said brace clearing said rest means when said housing is aligned with said bars.

4. The device of claim 2 further comprising latch means for locking said carriage to said appendage, said carriage being displaced to a forward position within said appendage, said latch means being pivotally secured to said carriage, and a linkage means for rotating said latch means, said latch means unlocking said carriage from said appendage when said latch means is rotated by said linkage means, said unlocked carriage being free to slide rearward within said appendage.

5. The device of claim 4 wherein said linkage means comprises a linkage having the rear end thereof pivotally secured to said latch means and having the forward end thereof protruding from within an aperture therethrough the forward end of said carriage and a spring means for keeping the forward end of said linkage protruding from within said aperture, said linkage being displaced when the forward end thereof comes into contact with said prop, displacement of said linkage rotating said latch means.

6. The device of claim 1 further comprising an elastic means for keeping said carriage displaced to a forward position within said appendage.

7. The device of claim 6 wherein said elastic means comprises a helical tension spring having an end thereof attached to a tab member of said bars and having the other end thereof attached to a tab member of said carriage.

8. The device of claim 1 wherein said cable receiver means is a carriage sheave secured to the forward end of said carriage, said cable training along said carriage sheave.

9. The device of claim 1 wherein said cable receiver means is an opening therethrough the forward end of said carriage, said cable extending through said opening.

10. The device of claim 1 wherein said brace means comprises:

(a) a retainer fixedly attached within said housing;

(b) an extendable spring retracted brace having a length thereof slidingly captured within a channel of said retainer;

(c) a rest means combined with said vehicle for supporting said brace, said brace being extended; and (d) a clasp integral with a nudge, said clasp being pivotally mounted upon said retainer and locking onto said extended brace, said clasp unlocking from said brace when said clasp is rotated via movement of said nudge, said brace retracting and clearing said rest means, said bars coming into contact with said nudge causing said movement of said nudge when said bars are being received into said housing.

11. An improved separable trailer tongue of the type having first and second assemblies which are united by winch means having a cable connected thereto for drawing said assemblies together and means for assuring that said assemblies remain united, wherein the improvement comprises:

(a) a first assembly acceptor integral with a coupler means for coupling the forward end of said acceptor to a towing vehicle, said acceptor having said cable also connected thereto and having an opening at the rear end thereof, said cable extending from within said opening;

(b) a base fixedly attached within said acceptor;

(c) a stay pivotally mounted upon said base for guiding said cable, said stay having spaced apart side members, said cable having a length thereof interposed between said side members of said stay;

(d) spring means for keeping said stay near perpendicularly arranged with respect to said base;

(e) a brace means for supporting said acceptor such that said acceptor is supported slanting downward from said vehicle, said acceptor being coupled to said vehicle;

(f) a second assembly inset having outer surface areas which are registrable with inner surface areas of said acceptor and having a longitudinally arranged channel along the underside thereof, said inset being received into said acceptor by entering said opening at the rear end of said acceptor when said assemblies are being united, said base and stay being received into said channel, said stay rotating as it is being received into said channel, said acceptor becoming aligned with said inset as said inset is being received into said acceptor; and (g) a cable receiver means for receiving said cable through the forward end of said inset, said cable extending from said acceptor and through the forward end of said inset and onward to said winch means.

12. The device of claim 11 wherein said brace means comprises:

(a) a retainer fixedly attached within said acceptor;

(b) an extendable spring retracted brace having a length thereof slidingly captured within a channel of said retainer;

(c) a rest means combined with said vehicle for supporting said brace, said brace being extended; and (d) a clasp integral with a nudge, said clasp being pivotally mounted upon said retainer and locking onto said extended brace, said clasp unlocking from said brace when said clasp is rotated via movement of said nudge, said brace retracting and clearing said rest means, said inset coming into contact with said nudge causing said movement of said nudge when said inset is being received into said housing.

13. The device of claim 11 wherein said brace means comprises a cantilevered brace integral with said acceptor and a rest means combined with said vehicle for supporting said brace, said brace abutting said rest means, said brace clearing said rest means when said acceptor is aligned with said inset.

14. An improved separable trailer tongue of the type having first and second assemblies which are united by winch means having a cable connected thereto for drawing said assemblies together and means for assuring that said assemblies remain united, wherein the improvement comprises:

(a) a first assembly receivable frame integral with a coupler means for coupling the forward end of said frame to a towing vehicle;

(b) a lift sheave secured interposed between side walls of said frame, said lift sheave being disposed at the upper rear end of said frame;

(c) a draw sheave, which is larger than said lift sheave, secured interposed between said side walls of said frame, said draw sheave being disposed forward of said lift sheave;

(d) a brace means for supporting said frame such that said frame is supported slanting downward from said vehicle, said frame being coupled to said vehicle;

(e) a second assembly receptor having a top wall and side walls and an opening at the forward end thereof for receiving said frame;

(f) receptor stop means fixedly attached to said frame for limiting movement of said receptor when said frame is received into said opening at the forward end of said receptor;

(g) a receptor sheave secured to said receptor, said receptor sheave being disposed at the upper forward end of said receptor; and (h) means for connecting said cable to the lower forward end of said receptor, said cable extending from said receptor to said frame, training about said draw and lift sheaves, extending from said frame to said receptor, training about the lower periphery of said receptor sheave and extending onward to said winch means.

15. The device of claim 14 wherein, when said assemblies are being united, said slanting frame supported by said brace means is received into said opening at the forward end of said receptor, an upper forward surface area of said receptor abutting said receptor stop means causing said frame to rotate and become aligned with said receptor.

16. The device of claim 15 wherein said brace means comprises a cantilevered strut integral with said frame and a rest means combined with said vehicle for supporting said strut, said strut abutting said rest means, said strut clearing said rest means when said frame is aligned with said receptor.

17. The device of claim 14 further comprising a cable guide means for assuring that said cable will train about said lift sheave when said assemblies are being united.

18. The device of claim 17 wherein said cable guide means comprises a pair of parallel spaced apart elongated retainers having a length of said cable disposed between said retainers, said retainers being joined together at the first ends thereof and having the second ends thereof pivotally secured about said lift sheave such that said retainers sandwich said lift sheave, and a spring means for keeping said retainers near perpendicularly arranged with respect to top surfaces of said frame, said retainers rotating and being received along with said frame into said opening at the forward end of said receptor when said assemblies are being united.

19. An improved separable trailer tongue of the type having first and second assemblies which are united by winch means having a cable connected thereto for drawing said assemblies together and means for assuring that said assemblies remain united, wherein the improvement comprises:

(a) a first assembly receivable frame integral with a coupler means for coupling the forward end of said frame to a towing vehicle, said frame having spaced apart side walls;

(b) a brace means for supporting said frame such that said frame is supported slanting downward from said vehicle, said frame being coupled to said vehicle;

(c) a second assembly receptor having a top wall and side walls and an opening at the forward end thereof for receiving said frame;

(d) receptor stop means fixedly attached to said frame for limiting movement of said receptor;

(e) a receptor sheave secured to the upper forward end of said receptor;

(f) means for connecting said cable to the lower forward end of said receptor; and (g) sheave means secured interposed between said walls of said frame for accepting a loop of said cable, said cable extending from said receptor to said frame, training about said sheave means, extending back to said receptor, training along the lower periphery of said receptor sheave and extending onward to said winch means.

20. The device of claim 19 wherein, when said assemblies are being united, said slanting frame supported by said brace means is received into said opening at the forward end of said receptor, an upper forward surface area of said receptor abutting said receptor stop means causing said slanting frame to rotate and become aligned with said receptor.

21. The device of claim 20 wherein said brace means comprises a cantilevered strut integral with said frame and a rest means combined with said vehicle for supporting said strut, said strut abutting said rest means, said strut clearing said rest means when said frame is aligned with said receptor.

22. The device of claim 19 wherein said sheave means is a lift sheave disposed at the upper rear end of said frame and a draw sheave disposed forward of said lift sheave.

23. The device of claim 22 further comprising a cable guide means for assuring that said cable will train about said lift sheave when said assemblies are being united.

24. The device of claim 23 wherein said cable guide means comprises a pair of parallel spaced apart elongated retainers having a length of said cable disposed between said retainers, said retainers being joined together at the first ends thereof and having the second ends thereof pivotally secured about said lift sheave such that said retainers sandwich said lift sheave, and a spring means for keeping said retainers near perpendicularly arranged with respect to top surfaces of said frame, said retainers rotating and being received along with said frame into said opening at the forward end of said receptor when said assemblies are being united.

25. The device of claim 19 wherein said sheave means is a lift sheave disposed at the upper rear end of said frame and at least two draw sheaves disposed forward of said lift sheave.

26. The device of claim 25 further comprising a cable guide means for assuring that said cable will train about said lift sheave when said assemblies are being united.

27. The device of claim 26 wherein said cable guide means comprises a pair of parallel spaced apart elongated retainers having a length of said cable disposed between said retainers, said retainers being joined together at the first ends thereof and having the second ends thereof pivotally secured about said lift sheave such that said retainers sandwich said lift sheave, and a spring means for keeping said retainers near perpendicularly arranged with respect to top surfaces of said frame, said retainers rotating and being received along with said frame into said opening at the forward end of said receptor when said assemblies are being united.

* * * * *